United States Patent
Toya et al.

(10) Patent No.: US 7,936,386 B2
(45) Date of Patent: May 3, 2011

(54) SOLID-STATE IMAGING DEVICE

(75) Inventors: Hiroshi Toya, Nara (JP); Takashi Fujioka, Hyogo (JP); Masayuki Masuyama, Kyoto (JP); Makoto Inagaki, Kyoto (JP)

(73) Assignee: Panasonic Corporation, Osaka (JP)

(*) Notice: Subject to any disclaimer, the term of this patent is extended or adjusted under 35 U.S.C. 154(b) by 1012 days.

(21) Appl. No.: 11/621,682

(22) Filed: Jan. 10, 2007

(65) Prior Publication Data
US 2007/0165117 A1 Jul. 19, 2007

(30) Foreign Application Priority Data

Jan. 17, 2006 (JP) .................................. 2006-009241
Dec. 5, 2006 (JP) .................................. 2006-328815

(51) Int. Cl.
H04N 5/217 (2006.01)
H04N 5/335 (2006.01)

(52) U.S. Cl. ...................................... 348/241; 348/294

(58) Field of Classification Search .................. 348/241, 348/243, 246, 249, 248, 222.1, 255, 294, 348/300
See application file for complete search history.

(56) References Cited

U.S. PATENT DOCUMENTS

| | | | | |
|---|---|---|---|---|
| 4,774,580 A * | 9/1988 | Miyasako | ...................... | 348/673 |
| 6,963,367 B1 * | 11/2005 | Hashimoto | .................... | 348/241 |
| 7,443,436 B2 * | 10/2008 | Masuyama et al. | ........... | 348/294 |
| 7,528,871 B2 * | 5/2009 | Masuyama et al. | ........... | 348/294 |
| 2003/0151686 A1 * | 8/2003 | Koyama | ........................ | 348/304 |
| 2004/0239786 A1 | 12/2004 | Masuyama et al. | | |
| 2005/0225653 A1 * | 10/2005 | Masuyama et al. | ........... | 348/241 |
| 2006/0013495 A1 * | 1/2006 | Duan et al. | .................... | 382/235 |
| 2008/0143863 A1 | 6/2008 | Masuyama et al. | | |

FOREIGN PATENT DOCUMENTS

| | | |
|---|---|---|
| JP | 2001-024949 | 1/2001 |
| JP | 2004-212263 | 7/2004 |
| JP | 2004-312785 | 11/2004 |

OTHER PUBLICATIONS

English Language Abstract of JP 2001-024949.
English Language Abstract of JP 2004-212263.

* cited by examiner

*Primary Examiner* — David L Ometz
*Assistant Examiner* — Ahmed A Berhan
(74) *Attorney, Agent, or Firm* — Greenblum & Bernstein, P.L.C.

(57) ABSTRACT

A solid-state imaging device which can, in response to the problem of black-crush occurring in an image when strong light is enters the device, positively detect black-crush in a state in which a variance margin has been secured. The solid-state imaging device outputs a luminance signal in accordance with an amount of received light, and includes: a pixel circuit having a light-receiving element; a signal output circuit having a sampling transistor which outputs, from a second signal output line, a luminance signal in accordance with the amount of light received by the light-receiving element, based on an output signal from the pixel circuit; and a high-intensity judgment circuit which is coupled by the pixel circuit and a judgment input coupling capacitor, judges whether or not light entering the light-receiving element is of high intensity based on the output signal from the pixel circuit, and in the case of judging the entering light to be of high intensity, outputs a luminance signal indicating high intensity.

21 Claims, 18 Drawing Sheets

SOLID-STATE IMAGING DEVICE

BACKGROUND OF THE INVENTION (1) Field of the Invention

The present invention relates to a solid-state imaging device that outputs a luminance signal in accordance with an amount of received light, and in particular to a solid-state imaging device, camera, and driving method for a solid-state imaging device that prevents the occurrence of black-crush in an image when strong light enters the device.

(2) Description of the Related Art

Recently, imaging devices which utilize solid-state imaging devices, such as consumer video cameras and digital cameras, have become common. Among such imaging devices, there are devices which employ amplifier-type image sensors as the solid-state imaging device.

While amplifier-type image sensors have excellent features such as low noise levels, they have a problem in that black-crush occurs in images when strong light enters the sensors. "Black-crush" refers to the phenomenon where, due to strong light, electric charge overflows from light-receiving elements and builds up in detection capacitors, which leads to a decrease in the amount of electric charge that can be stored; this in turn leads to parts in images which are supposed to be bright turning black.

Various technologies have been proposed conventionally as means to avoid this black-crush phenomenon (for example, see Patent Reference 1: Japanese Patent Application No. 2004-212263).

Patent Reference 1 discloses the following as a means to avoid black-crush: an MOS image sensor, which is an amplifier-type image sensor, and which includes an output unit that outputs, per unit cell, a luminance signal indicating the difference between a reset voltage and a read voltage when the read voltage falls within a predetermined range, and outputs, per unit cell, a luminance signal indicating increased intensity when the read voltage does not fall within the predetermined range. The image sensor described in Patent Reference 1 attempts to avoid the black-crush phenomenon through such a setup.

However, the circuit disclosed in Patent Reference 1 has the following problems.

First, in the circuit described in Patent Reference 1, a bypass transistor is provided for bypassing the clamp capacitor, and the read voltage is applied to the bypass transistor; when the bypass is applied to the gate terminal thereof and a drop in the read voltage caused by high-intensity light exceeds a predetermined voltage range, current flows in the subthreshold region of the bypass transistor, and a luminance signal indicating high intensity is outputted. However, the current in the subthreshold region is minute, and thus there are cases where variance occurs in the subthreshold current due to shifting and variance in the read voltage of the unit cell. Accordingly, the circuit described in Patent Reference 1 has a problem in that the operation for outputting the luminance signal that indicates the intensity is unstable.

Furthermore, with the circuit described in Patent Reference 1, the timing at which current flows changes in the case where the driving frequency, driving timing, and so on of the solid-state imaging device have been changed; therefore, there is a need to adjust the gate voltage of the bypass transistor and optimize the subthreshold current. In other words, the circuit described in Patent Reference 1 has another problem in that the configuration of a high-intensity judgment circuit must be changed each time the driving frequency, driving timing, and so on are changed.

Further still, with the circuit described in Patent Reference 1, in order to positively judge the intensity, the abovementioned predetermined range must be maintained against shifting in the read voltage caused by fluctuations in production processes, variation in the abovementioned subthreshold current, and so on; therefore, the luminance signal range is restricted. In other words, the circuit described in Patent Reference 1 has yet another problem in that the dynamic range of the luminance signal decreases so that the intensity can be judged while maintaining a constant margin for shifting, variance, and so on in the signal caused by fluctuations in production processes.

Accordingly, an object of the present invention, which has been conceived in light of the abovementioned problems, is to provide a solid-state imaging device and driving method thereof which, in response to the problem of black-crush occurring in an image when strong light enters the device, positively judges the occurrence of black-crush in a state in which a variance margin has been secured, without needing to change the configuration in response to changes in driving frequency or the like; and which can positively judge the occurrence of black-crush while maintaining the dynamic range of signals even amidst fluctuations in production processes.

SUMMARY OF THE INVENTION

To achieve the abovementioned object, the solid-state imaging device according to the present invention which outputs a luminance signal in accordance with an amount of light entering the device, and includes: an imaging unit in which plural pixel circuits are arranged one- or two-dimensionally, each pixel circuit including a photoelectric conversion unit, and each pixel circuit outputting a reset voltage and a read voltage, the reset voltage being a voltage generated when the photoelectric conversion unit is reset, and the read voltage being a voltage generated through photoelectric conversion being performed by the photoelectric conversion unit; a first signal output line which is connected to a number of the pixel circuits and which carries the reset voltage and read voltage outputted from the pixel circuits; a signal output circuit connected to the first signal output line and which outputs, from a second signal output line, a luminance signal in accordance with an amount of light received by the photoelectric conversion unit, based on the reset voltage and read voltage outputted to the first signal output line; and a high-intensity judgment circuit connected to the first signal output line via a first capacitor, which judges whether or not light entering the photoelectric conversion unit is of high intensity based on a voltage signal in the first signal output line, and, upon judging entering light of high intensity, outputs a luminance signal indicating high intensity to the second signal output line. In other words, the high-intensity judgment circuit judges whether or not the entering light is of high intensity based on the AC component of the voltage signal in the first signal output line.

Through this, the pixel circuit and the high-intensity judgment circuit are coupled by a capacitor, and thus signals of high intensity among the output signals from the pixel circuit are detected through the AC component at high speed. Accordingly, judgment of the intensity is performed in a stable manner without being affected by DC current fluctuation such as variance and shifting in the output signal. In addition, judgment of the intensity is performed without being affected by DC current fluctuation in the output signal and without requiring the configuration of the high-intensity judgment circuit to be altered, even in the case where the driving frequency or the like has been changed. Therefore, a problem in which the dynamic range of intensity information used to judge the intensity is restricted does not arise.

Here, it is preferable for the high-intensity judgment circuit to judge whether or not the entering light is of high intensity during a period in which the photoelectric conversion unit is reset or immediately after the photoelectric conversion unit has been reset. In particular, the driving timing can be shortened by performing the judgment in parallel with the reset interval.

In addition, the high-intensity judgment circuit may include: a judgment input line, which is a signal line connected to the first capacitor; a second capacitor, one end of which is connected to the judgment input line; and a bias voltage adding circuit connected to the other end of the second capacitor and which adds a constant voltage to the judgment input line via the second capacitor. In addition, the high-intensity judgment circuit may judge whether or not the entering light is of high intensity by comparing a voltage at the judgment input line with a constant threshold value after the certain voltage has been added. Through this, whether the light entering the device is in the normal state or the high-intensity state can be judged via a simple circuit.

Here, the high-intensity judgment circuit may include: a judgment input line, which is a signal line connected to one end of the first capacitor; a second capacitor, one end of which is connected to the other end of the first capacitor; and a bias voltage adding circuit connected to the other end of the second capacitor and which adds a constant voltage to the judgment input line via the second capacitor. In addition, the high-intensity judgment circuit may judge whether or not the entering light is of high intensity by comparing a voltage in the judgment input line with a constant threshold value after the constant voltage has been added. Through this, when the signal is transferred from the first signal output line to the judgment input line, capacitive division can be avoided, the signal is not dampened, and high intensity can be judged in an accurate manner.

Furthermore, it is preferable for the high-intensity judgment circuit to be connected to the first capacitor and to include a first switch transistor which closes or opens the connection between the first signal output line and said intensity judgment circuit via the first capacitor; and it is preferable for the first switch transistor to cut the connection so as not to transfer fluctuation in a voltage signal in the first signal output line and in a voltage signal in the input stage of the high-intensity judgment circuit. Accordingly, the first signal output line and the high-intensity judgment circuit unnecessarily influencing one another can be prevented, and judgment of the intensity can be performed in a stable manner.

Further still, it is preferable for the high-intensity judgment circuit to judge whether or not the difference between the reset voltage and the read voltage outputted to the first signal output line is within a predetermined range, and to judge that the entering light is of high intensity in the case where the difference is judged not to be within the predetermined range; at this time, it is preferable for the predetermined range to be a range which includes the voltage signal outputted to the high-intensity judgment circuit when light of a maximum intensity enters the pixel circuits, and to be a range smaller than the dynamic range of the voltage signal outputted from the pixel circuits to the high-intensity judgment circuit. Through this, luminance signals in the normal and high-intensity states can be distinguished and the high-intensity state detected with certainty.

Moreover, it is preferable for the high-intensity judgment circuit to include a judgment output circuit which outputs, to the second signal output line, a voltage of the same polarity as and a saturation greater than or equal to the luminance signal outputted from the signal output circuit to the second signal output line, in the case where the entering light is judged to be of high intensity. Through this, luminance signals of the same polarity and for which the normal state and the high-intensity state can be distinguished are outputted to the second signal output line, and therefore a latter-stage circuit for processing the signals can be simplified.

In addition, the high-intensity judgment circuit may include: a judgment input line, which is a signal line connected to the first capacitor; and a judgment amplification circuit which judges whether or not the entering light is of high intensity based on a voltage signal at the judgment input line, and which amplifies the voltage signal at the judgment input line and outputs the signal obtained through the amplification as a signal indicating a result of the judgment. Through this, rather than simply judging the intensity, an amplified signal is outputted as the judgment results, and thus a luminance signal indicating the normal state or the high-intensity state can be outputted to the second signal output line in a stable manner without being influenced by noise or the like.

In addition, the high-intensity judgment circuit may judge whether or not the entering light is of high intensity during i) an interval from when the photoelectric conversion unit outputs the reset voltage to the first signal output line to when the photoelectric conversion unit outputs the read voltage to the first signal output line or ii) an interval from when the photoelectric conversion unit outputs the read voltage to when the photoelectric conversion unit outputs the reset voltage in the next imaging period, and outputs the luminance signal indicating that the entering light is of high intensity. In particular, it is preferable for judgment of whether or not the entering light is of high intensity during the interval from when the reset voltage is outputted to when the read voltage is outputted. Through this, judgment of the intensity and output of the judgment results is performed in parallel with the generation of the normal-state luminance signal, which allows the driving timing to be shortened.

Furthermore, it is preferable, in judging of the intensity, for the resetting of the photoelectric conversion unit for the judging to be performed in advance at a timing later than resetting for photoelectric conversion. Through this, the judgment input line is reset in a state in which fluctuation of the potential of the judgment input line caused by resetting of the photoelectric conversion unit is nonexistent, which makes it possible to perform judgment in a stable manner.

It should be noted that the present invention may be realized not only as the abovementioned solid-state imaging device, but also as a driving method thereof, an imaging camera which includes the solid-state imaging device, and as an integrated circuit in which the solid-state imaging device is formed on a semiconductor substrate.

With the solid-state imaging device and driving method thereof according to the present invention, a pixel circuit and a high-intensity detection circuit are coupled by a capacitor, and the intensity of output signals from the pixel circuit is judged through the AC component. Thus, a solid-state imaging device which can, in response to the problem of black-crush occurring in an image when strong light enters the device, positively judge the occurrence of black-crush in a state in which a variance margin has been secured, without needing to change the configuration in response to changes in driving frequency or the like, and which can positively judge the occurrence of black-crush while maintaining the dynamic range of signals even amidst fluctuations in production processes, can be realized.

Therefore, it can be said that the practical value of the present invention is extremely high in today's world where imaging devices utilizing solid-state imaging devices, such as consumer video cameras and digital still cameras, have become common.

FURTHER INFORMATION ABOUT TECHNICAL BACKGROUND TO THIS APPLICATION

The disclosure of Japanese Patent Application No. 2006-009241, filed on Jan. 17, 2006, and the disclosure of Japanese Patent Application No. 2006-328815, filed on Dec. 5, 2006, including specification, drawings and claims, are incorporated herein by reference in their entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENTS

Hereafter, embodiments of the solid-state imaging device according the present invention shall be described in detail with reference to the drawings.

First Embodiment

Figure 1:
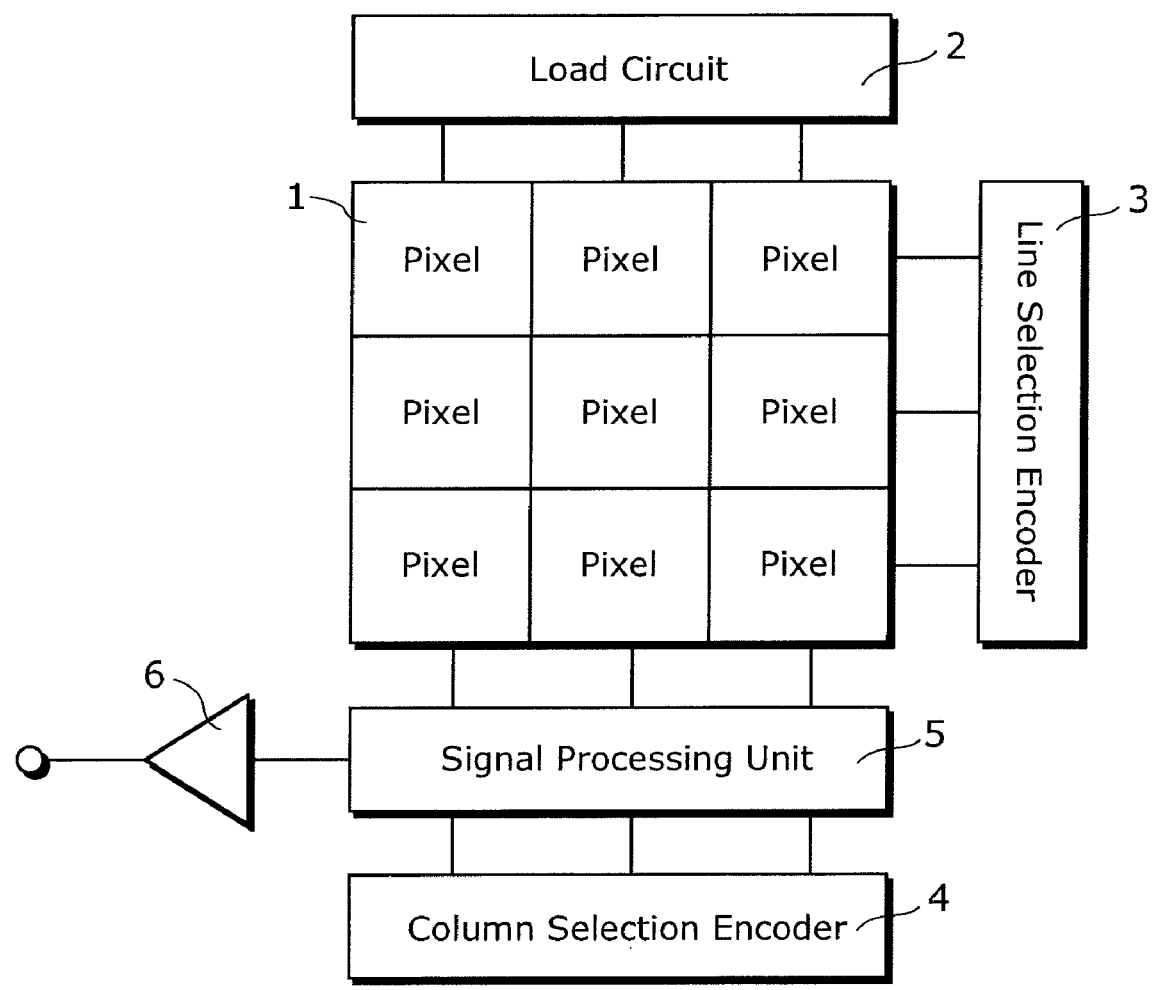
FIG. 1 is a diagram showing an overall configuration of a solid-state imaging device according to the first through fifth embodiments of the present invention.

FIG. 1 is a diagram showing an overall configuration of a solid-state imaging device according to the first embodiment of the present invention.

The solid-state imaging device is an amplifier-type image sensor which has a function for outputting luminance signals in accordance with the amount of received light, and for avoiding the abovementioned black-crush phenomenon. The solid-state imaging device in configured of an imaging unit 1, a load circuit 2, a line selection encoder 3, a column selection encoder 4, a signal processing unit 5, and an output circuit 6.

The imaging unit 1 is an imaging region made up of plural pixel circuits (unit cells) arranged either one- or two-dimensionally, and includes a photoelectric conversion unit which converts light to an electric signal. Each pixel circuit outputs a reset voltage, which is a voltage when the photoelectric conversion unit is reset, and a read voltage, which is a voltage arising due to photoelectric conversion performed by the photoelectric conversion unit. The example given in FIG. 1 shows nine pixels placed in a two-dimensional 3×3 arrangement. However, it should be noted that the actual total number of pixels will be several thousand in a one-dimensional arrangement, and between several hundred thousand and several million in a two-dimensional arrangement.

The load circuit 2 is connected to each vertical column, with the same load circuit 2 being connected to each column. The load circuit 2 loads the pixels of the imaging unit 1, per column, so as to read out an output voltage.

The line selection encoder 3 is a circuit which outputs, via three control lines, a control signal, or "RESET", "READ", and "LSEL", per horizontal line. The pixels of the imaging unit 1 are controlled on a line-by-line basis through these control signals, in which they are reset (initialized), read (read out), or line-selected (the line is selected).

The column selection encoder 4 is a circuit which outputs, via a control line, a column selection signal per vertical column, and sequentially selects the columns of the imaging unit 1 via the column selection signals.

The signal processing unit 5 is connected to each vertical column, with the same signal processing unit 5 being connected to each column. The signal processing unit 5 processes the output signals from the imaging unit 1 on a column-by-column basis and sequentially outputs the resultants to the output circuit 6.

The output circuit 6 performs, on the signals sequentially sent from the signal processing unit 5, conversion necessary for outputting the signals to the exterior, and outputs the signals.

Figure 2:
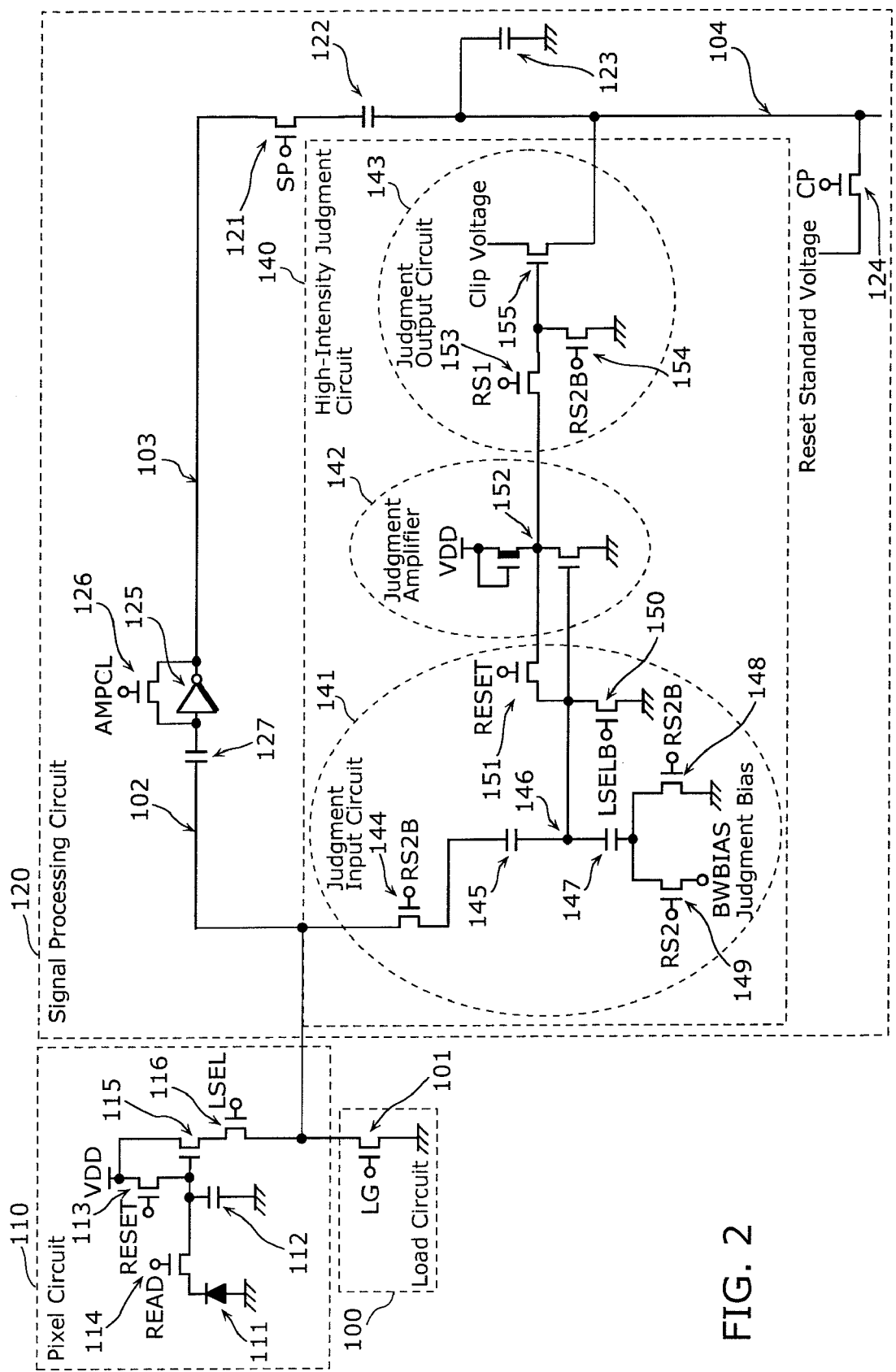
FIG. 2 is a detailed schematic of a solid-state imaging device according to the first embodiment of the present invention.

FIG. 2 is a detailed schematic focusing on one pixel in the solid-state imaging device shown in FIG. 1. This schematic shows a load circuit 100, a pixel circuit 110, and a signal processing circuit 120 (which includes a high-intensity judgment circuit 140). In the present embodiment, these circuits are all configured of NMOS transistors. Note that in this schematic, the reference symbol given to the gate of each transistor is the signal name of the control pulse supplied to that gate. Furthermore, the various control pulses are generated using signals or the like from the line selection encoder 3 and the column selection encoder 4 shown in FIG. 1 so as to have levels that change at a certain timing (mentioned later), and are outputted from control pulse generation circuits (circuits provided in the signal processing unit 5, not shown in the schematic, or timing control units, which shall be mentioned later) which supply each transistor.

The load circuit 100 is equivalent to a single circuit within the load circuit 2 shown in FIG. 1, and includes a load transistor 101 connected between a first signal output line 102 and a ground (GND). A load voltage (LG) is supplied to the gate of the load transistor 101.

The pixel circuit 110 is equivalent to a single unit cell within the imaging unit 1 shown in FIG. 1. The pixel circuit 110 is a circuit which outputs a reset voltage, which is an amplified initial voltage, and a read voltage, which is an amplified read-out voltage, to the first signal output line 102, and includes: a light-receiving element 111, such as a photodiode, which performs photoelectric conversion on light entering the device and outputs a load; a capacitor (floating diffusion) 112 which accumulates the load outputted by the light-receiving element 111 and outputs the accumulated load as an electric signal; a reset transistor 113 which resets a voltage determined by the capacitor 112 to an initial voltage (here, VDD); a read transistor 114 which supplies the load outputted by the light-receiving element 111 to the capacitor 112; an amplification transistor which tracks the voltage determined by the capacitor 112 and outputs a voltage which changes the tracked voltage; and a line select transistor 116 which outputs the voltage from the amplification transistor 115 to the first signal output line 102 when a line select (LSEL) signal is received from the line selection encoder 3.

Note that the light-receiving element 111 and the capacitor 112, which are the essential elements among the constituent elements that make up the pixel circuit 110, and which take on the role of converting light to an electrical signal (voltage), may be collectively referred to as a photoelectric conversion unit.

The signal processing circuit 120 is equivalent to a single circuit within the signal processing unit 5, the single circuit being used for a single vertical column. The signal processing circuit 120 is configured of: (1) a signal output circuit which is connected to the first signal output line 102 and which outputs, from a second signal output line 104, a luminance signal in accordance with the amount of received light in the photoelectric conversion unit, based on the reset voltage and read voltage outputted to the first signal output line 102 (the signal output circuit includes all parts of the signal processing circuit 120 with the exception of the intensity detection circuit 140); and (2) the high-intensity judgment circuit 140, which is coupled with the first signal output line 102 via a capacitor, judges whether or not the light entering the photoelectric conversion unit is of high intensity based on the electric signal in the first signal output line 102, and in the case where the light has been judged as being of high intensity, outputs a luminance signal indicating that the light is of high intensity (in other words, that strong light enters the light-receiving element 111).

Note that a state in which strong light enters the light-receiving element 111, or in other words, a state in which black-crush would normally occur in an image, is referred to as a "high-intensity state", whereas a state in which strong light does not enter the light-receiving element 111 is referred to as a "normal state".

The signal output circuit is a circuit which, in the case where the difference between the reset voltage and the read voltage outputted from the pixel circuit 110 into the first signal output line 102 is within a predetermined range, outputs that difference as a normal state luminance signal. The signal output circuit includes: a sampling transistor 121 and a clamp capacitor 122 connected in series between a third signal output line 103 and the second signal output line 104; a sampling capacitor 123 connected between the second signal output line 104 and a ground; a clamp transistor 124 connected between the second signal output line 104 and a standard voltage (reset standard voltage) terminal; an inverting amplifier 125 which amplifies the voltage of the first signal output line 102 and outputs the amplified voltage to the third signal output line 103; an inverting amplifier reset transistor 126 which resets the inverting amplifier 125 and sets a standard voltage for operation; and an inverting amplifier coupling capacitor 127 which transfers an AC component of the first signal output line 102 to the inverting amplifier 125.

Note that the sampling transistor 121, clamp capacitor 122, sampling capacitor 123, and clamp transistor 124 have a function for eliminating noise present in signals outputted by the unit cells, and thus form a noise cancelling circuit.

The high-intensity judgment circuit 140 is a circuit which judges, for electric signals in the first signal output line 102, whether or not the light entering the pixel circuit is of high intensity, based on the AC component. To be more specific, in the case where the difference between the reset voltage and the read voltage outputted from the pixel circuit 110 to the first signal output line 102 exceeds the predetermined range, the high-intensity judgment circuit 140 outputs a luminance signal which indicates high intensity. The high-intensity judgment circuit can be roughly divided into a judgment input circuit 141, a judgment amplifier 142, and a judgment output circuit 143. Here, the "predetermined range" refers to a range which includes the electrical signal inputted into the high-intensity judgment circuit 140 when light of a maximum intensity enters the pixel circuit 110, and which is smaller than the dynamic range of the electric signal inputted into the high-intensity judgment circuit 140 from the pixel circuit 110. Setting such a range makes it possible to distinguish whether a luminance signal outputted to the second signal output line 104 is a normal state signal or a high-intensity state signal.

The judgment input circuit 141 is a circuit forming the input stage of the high-intensity judgment circuit 140, and has a characteristic of capturing the AC component of a signal in the first signal output line 102 at high speed, via capacitive coupling. The judgment input circuit 141 includes: an input switch transistor 144, which is connected to a judgment input coupling capacitor 145 used to implement the capacitive coupling, and which connects/disconnects the first signal output line 102 to/from the high-intensity judgment circuit 140 via the judgment input coupling capacitor 145; the judgment input coupling capacitor 145; a judgment standby switch transistor 148 and a judgment bias input switch transistor 149 which switch between a judgment bias and a ground and transfer the voltage thereof to a judgment input line 146; a judgment bias coupling capacitor 147; a standby switch transistor 150 which grounds the judgment input line 146 so as to decrease the amount of current consumed when the judgment function is stopped; and a judgment capacitor reset transistor 151 which resets the judgment input line 146 to its initial state.

Note that the judgment standby switch transistor 148 and the judgment bias input switch transistor 149 make up a bias voltage adding circuit which adds a constant voltage to the judgment input line 146 via the judgment bias coupling capacitor 147. In addition, the input switch transistor 144 cuts the connection between the first signal output line 102 and the input stage of the high-intensity judgment circuit 140 via the judgment input coupling capacitor 145 when the electric signal in the first signal output line 102 and the electric signal in the input stage of the high-intensity judgment circuit (the judgment input line 146) fluctuate, so that mutual negative influence arising from the transfer of inductive is avoided.

The judgment amplifier 142 is a circuit which judges whether or not light entering the pixel circuit 110 is of high intensity based on the electric signal in the judgment input line 146, as well as amplifying the electric signal in the judgment input line 146 and outputting the signal obtained through the amplification as the judgment result. In the present embodiment, the judgment amplifier 142 judges whether the light is in the "high-intensity state" or in the "normal state" by comparing the potential in the judgment input line 146 after the constant voltage has been added by the bias voltage adding circuit with a constant threshold, and outputs the result of the judgment to a judgment output line 152. The judgment amplifier 142 is configured of two transistors connected in series, and functions as a comparator. In other words, in the case where the voltage of the judgment input line 146 is greater than the threshold of an NMOS transistor connected to a ground (the normal state), LO (ground) is outputted to the judgment output line 152, and in the case where the voltage of the judgment input line 146 is less than the threshold (the high-intensity state), HI (VDD) is outputted to the judgment output line 152.

The judgment output circuit 143 is a circuit which outputs a voltage greater than the saturation voltage of that luminance signal to the second signal output line 104, the voltage being of the same polarity as that of the luminance signal outputted to the second signal output line 104 from the signal output circuit in the case where the judgment amplifier 142 has judged the light entering the device to be in the high-intensity state. In the present embodiment, the judgment output circuit 143 outputs (or does not output) a clip voltage to the second signal output line 104 depending on the signal (judgment result) sent via the judgment output line 152. The judgment output circuit 143 includes: an output switch transistor 153 which transfers the signal of the judgment output line 152 to a clip transistor 155; a standby switch transistor 154 which grounds the gate (control terminal) of the clip transistor 155 to reduce the current consumed when the judgment function is stopped; and the clip transistor 155 which allows the clip voltage to pass the clip voltage, or prevent the clip voltage from passing, to the second signal output line 104. In the case where the result of the judgment performed by the judgment amplifier 142 indicates a judgment of high intensity (the case where the judgment output line 152 is HIGH), the clip transistor 155 outputs a luminance signal indicating high intensity (in other words, the clip voltage) to the second signal output line 104, rather than using the luminance signal held in the second signal output line 104. In the present embodiment, the judgment output circuit 143 performs the following: judging whether or not the light entering the photoelectric conversion unit 110 is of high intensity, in the period of time from when the photoelectric conversion unit 110 outputs the read voltage to the first signal output line 102 to when the reset voltage is outputted in the next occurrence of capturing; and outputting the luminance signal indicating that the light entering is of high intensity.

Note that a higher voltage or a lower voltage for the reset standard voltage may be selected for the clip voltage based on the signal polarity of the second signal output line 104. In the first embodiment, a higher voltage signal than the reset standard voltage is outputted to the second signal output line 104 as the normal state luminance signal, and therefore the clip voltage is also set to a higher voltage for the reset standard voltage. However, conversely, when a lower voltage signal than the reset standard voltage is outputted to the second signal output line 104 as the normal state luminance signal, the clip voltage is also set to a lower voltage than the reset standard voltage. Specifically, it is preferable for the clip voltage to be set at a constant voltage so that the difference between the clip voltage and the reset standard voltage in the second signal output line 104 is greater than a saturation signal. This is so that the normal state luminance signal and the luminance signal that indicates high intensity can be distinguished from one another.

In addition, the standby switch transistor 150 of the judgment input circuit 141 and the standby switch transistor 154 of the judgment output circuit 143 realize a function for stopping the black-crush judgment function and suppressing current consumption by fixing the connection terminals (the connection terminal of the judgment amplifier 142 and the connection terminal of the clip transistor 155) at a certain potential.

In this manner, the solid-state imaging device according to the present first embodiment features a configuration through which it can judge whether or not the phenomenon in which black-crush occurs in images when strong light enters by utilizing a noise-canceling circuit (in other words, the normal state luminance signal and the luminance signal indicating high intensity are selectively outputted to the signal output line 104 in the noise canceling circuit).

Next, a driving method for the solid-state imaging device of the present invention, which can judge black-crush occurring in images and prevent the degradation of image qualities caused by black-crush, shall be described.

Figure 3:
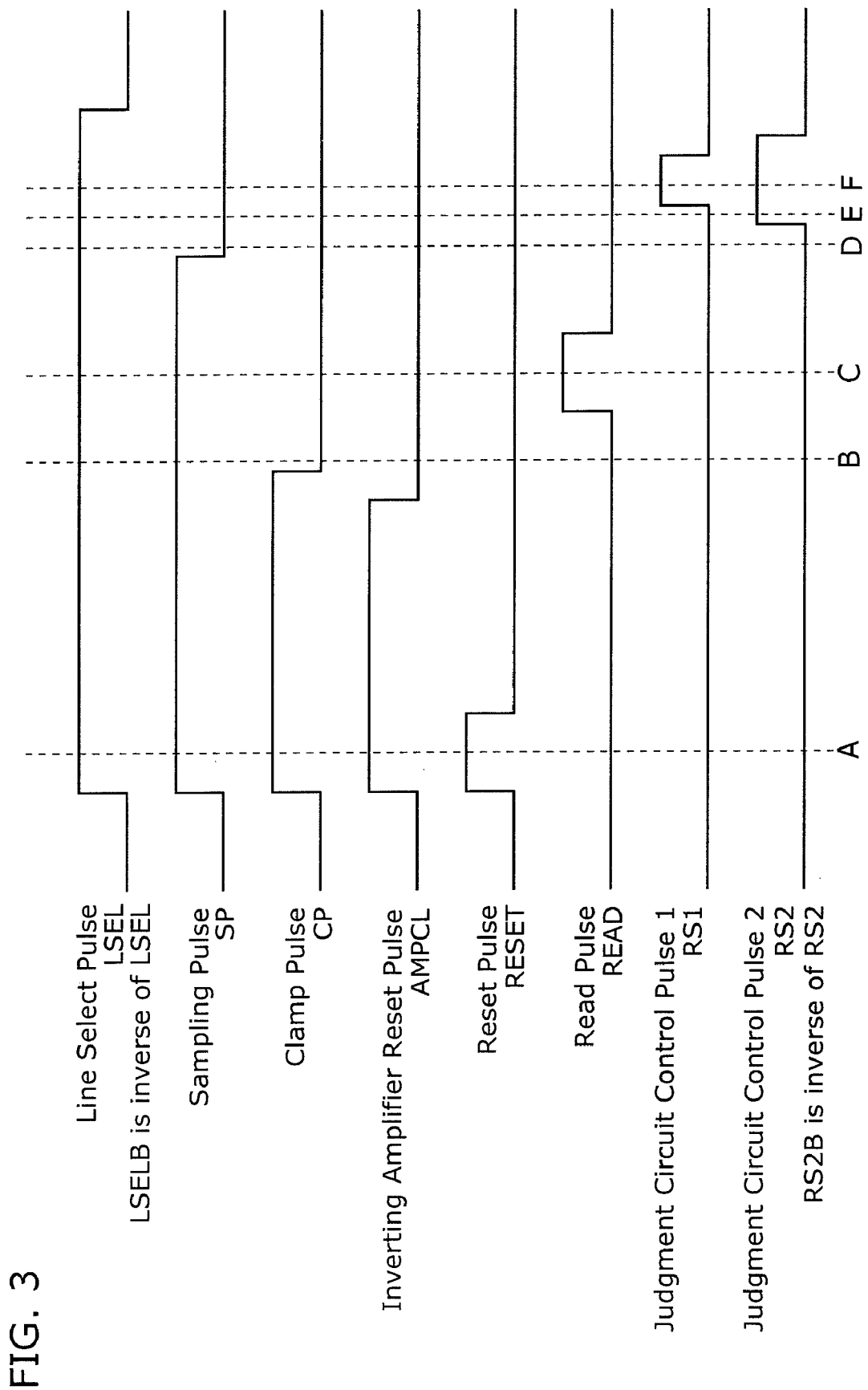
FIG. 3 is a diagram showing timings of control pulses in the solid-state imaging device.

FIG. 3 is a diagram showing the timing of signals which control the circuits (control pulses) shown in FIG. 2. Each pulse is supplied to the gate of a transistor; the transistor is ON when the pulse is HIGH, and the transistor is OFF when the pulse is LOW.

The line select pulse LSEL is supplied to a line select transistor 116 of the pixel circuit 110, and is a control signal for selecting the pixel circuit 110. Note that an inverted line select pulse LSELB is a line select pulse LSEL signal that has been inverted. The inverted line select pulse LSELB is a control signal which is supplied to the gate of the standby switch transistor 150 of the judgment input circuit 141 and is for controlling the high-intensity judgment circuit 140 to switch from a stopped state to a functioning state.

A sampling pulse SP is supplied to the gate of a sampling transistor 121 of the signal processing circuit 120. The sampling pulse SP is a control signal for causing the signal of the third signal output line 103 to be transferred to the second signal output line 104.

A clamp pulse CP is supplied to the gate of a clamp transistor 124 of the signal processing circuit 120. The clamp pulse CP is a control signal for resetting the second signal output line 104 to its initial state.

An inverting amplifier reset pulse AMPCL is supplied to the gate of an inverting amplifier reset transistor 126 of the signal processing circuit 120. The inverting amplifier reset pulse AMPCL is a control signal for resetting the inverting amplifier 125, which is provided for noise reduction, to its initial state.

A reset pulse RESET is supplied to the gate of the reset transistor 113 of the pixel circuit 110 and to the gate of the judgment capacitor reset transistor 151 of the judgment input circuit 141. The reset pulse RESET is a control signal for resetting the capacitor 112 of the pixel circuit 110 to its original state and for resetting the high-intensity judgment circuit 140 to its original state.

A read pulse READ is supplied to the gate of the read transistor 114 of the pixel circuit 110. The read pulse READ is a control signal for transferring the electric load accumulated by the light-receiving element 111 to the capacitor 112.

A judgment circuit control pulse 1 (RS1) is supplied to the gate of the output switch transistor 153 of the judgment output circuit 143. The judgment circuit control pulse 1 (RS1) is a control signal for transferring the result of the judgment performed by the high-intensity judgment circuit 140 to the clip transistor 155.

A judgment circuit control pulse 2 (RS2) is supplied to the gate of the judgment bias input switch transistor 149 of the judgment input circuit 141. The judgment circuit control pulse 2 (RS2) is a control signal for causing judgment by the judgment amplifier 142 to occur. Note that an inverted judgment circuit control pulse RS2B is a judgment circuit control pulse RS2 signal that has been inverted. The inverted judgment circuit control pulse RS2B is supplied to the gate of the input switch transistor 144 and judgment standby switch transistor 148 of the judgment input circuit 141, and to the gate of the standby switch transistor 154 of the judgment output circuit 143. The inverted judgment circuit control pulse RS2B is a control signal for maintaining judgment and judgment standby states.

Figure 4:
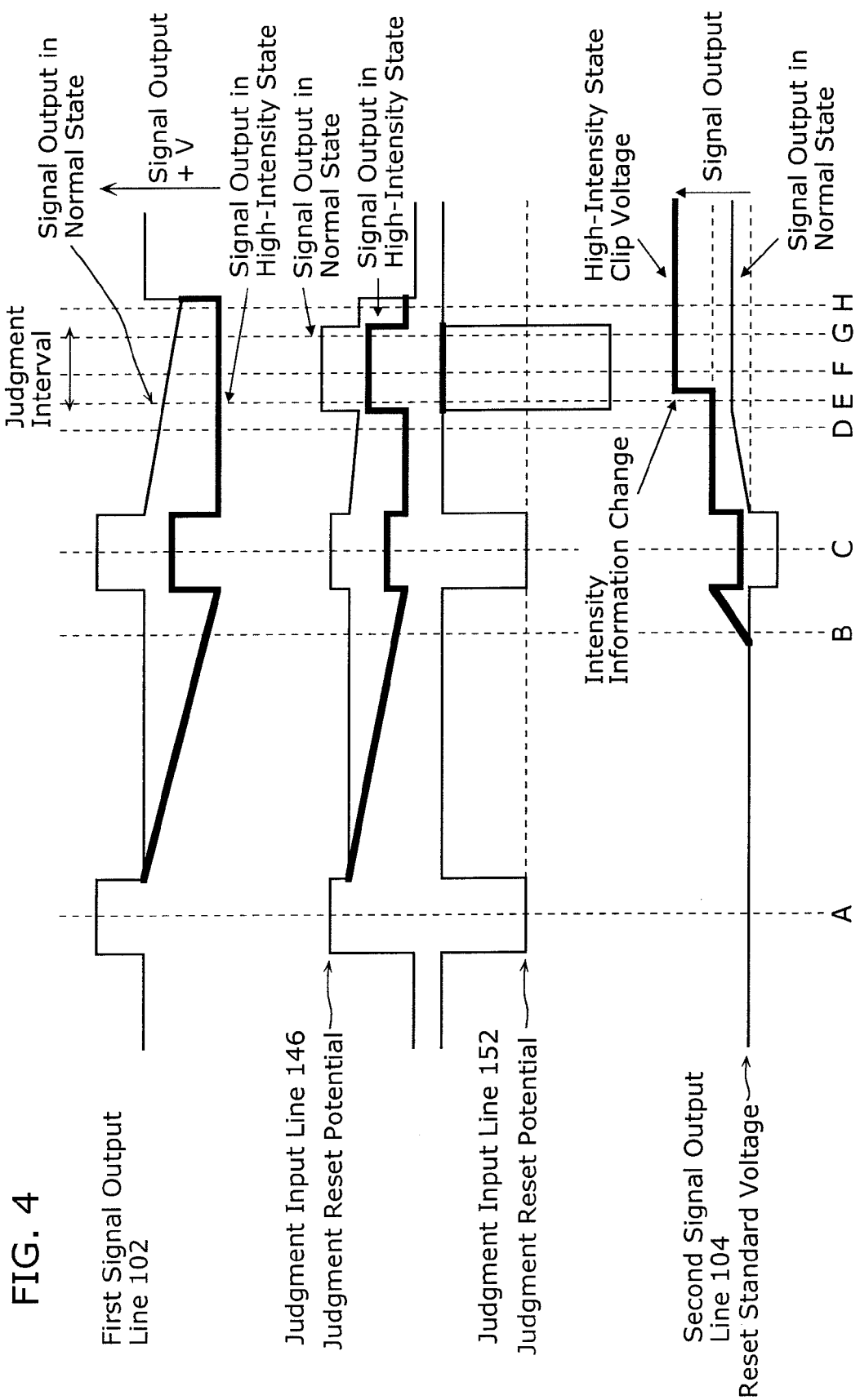
FIG. 4 is a diagram showing signal waveforms occurring in the principle areas of the solid-state imaging device.

FIG. 4 is a diagram showing signal waveforms occurring in the principle areas of the solid-state imaging device. Here, signal waveforms are shown for: the first signal output line 102, which is the output of the pixel circuit 110; the judgment input line 146 and the judgment output line 152, which are in the high-intensity judgment circuit 140; and the second signal output line 104. It should be noted that in this diagram, a signal waveform found in the normal state ("normal state signal output") is indicated by a normal line, whereas a signal waveform found in the high-intensity state ("high-intensity signal output") is indicated by a bold line. Timings A through F shown in this diagram correspond to those shown in FIG. 3. Hereafter, operations performed in each of the timings A through F shall be described.

In timing A, the capacitor 112 of the pixel circuit 110 is reset to its initial state via the reset transistor 113, and the judgment input line 146 and the judgment output line 152 of the judgment capacitor reset transistor 151 are reset to their respective initial states, due to the reset pulse RESET being HIGH.

In timing B, resetting of the inverting amplifier 125 to its initial state via the inverting amplifier reset transistor 126 is completed, due to the inverting amplifier reset pulse AMPCL being LO, and resetting of the second signal output line 104 to its initial state via the clamp transistor 124 is completed, due to the clamp pulse CP. At this time, when high-intensity light enters, the electric load of the light-receiving element 111 overflows into the capacitor 112, and the reset potential of the capacitor 112 decreases. This decreased potential is outputted to the first signal output line 102 via the line select transistor 116. Accordingly, in a high-intensity state, the potential of the first signal output line 102 decreases, as can be seen by comparing the high-intensity signal output (bold line) with the normal state signal output (normal line). Such a decrease in the potential of the first signal output line 102 is transferred at high speed to the judgment input line 146 via the input switch transistor 144 and the judgment input coupling capacitor 145. Note that such a decrease in potential is a cause of black-crush.

In timing C, the electric load of the light-receiving element 111 is transferred to the capacitor 112 via the read transistor 114, due to the read pulse READ being HIGH.

In timing D, the sampling transistor 121 is set to OFF due to the sampling pulse SP being LO; a difference signal indicating the difference between the reset potential (the potential of the capacitor 112 in timing B) and the read potential (the potential of the capacitor 112 in timing C) is accumulated in the sampling capacitor 123 connected to the second signal output line 104.

In timing E, a judgment bias voltage BWBIAS is applied to the judgment input line 146 via the judgment bias input switch transistor 149 and the judgment bias coupling capacitor 147, due to the judgment circuit control pulse RS2 being HIGH; the potential of the post-application judgment input line 146 is compared with a threshold of the judgment amplifier 142, and whether the light entering the device is in the normal state or the high-intensity state is judged thereby.

To be more specific, the reset potential of the capacitor 112 of the pixel circuit 110 is caused to correspond to the reset potential of the judgment input line 146, and the high-intensity state is judged when the potential of the judgment input line 146 drops below a saturation signal (a signal indicating the maximum intensity occurring in the normal state). In other words, the amount that the potential of the judgment input line 146 drops is added with the judgment bias voltage BWBIAS, and is compared with the judgment reset potential. In the high-intensity state, because the potential of the judgment input line 146 after being added with the judgment bias voltage BWBIAS does not exceed the threshold of the judgment amplifier 142, the judgment amplifier 142 is non-conductive, and HIGH is outputted to the judgment output line 152. On the other hand, in the normal state, because the potential of the judgment input line 146 after being added with the judgment bias voltage BWBIAS exceeds the threshold of the judgment amplifier 142, the judgment amplifier 142 is conductive, and LO is outputted to the judgment output line 152.

Note that the judgment bias voltage BWBIAS is optimized to a voltage lower than the dynamic range of the first signal output line 102. In other words, the judgment bias voltage BWBIAS is set so that the potential of the judgment input line 146 after being added with the judgment bias voltage BWBIAS exceeds the threshold of the judgment amplifier 142 in the normal state and does not exceed the threshold of the judgment amplifier 142 in the high-intensity state. Moreover, when the judgment bias voltage BWBIAS is applied to the judgment input line 146, the potential of the first signal output line 102 is caused via the judgment input coupling capacitor 145 to fluctuate, and furthermore, the connection between the first signal output line 102 and the judgment input line 146 is broken so that the accumulated electric load of other light-receiving elements 111 is not caused to fluctuate due to the capacitive coupling; that is, the input switch transistor 144 is set to OFF by the inverted judgment circuit control pulse RS2B.

In timing F, the potential of the judgment output line 152 (the judgment result) is transferred to the clip transistor 155 via the output switch transistor 153 due to the judgment circuit control pulse 1 (RS1) being HIGH, and the clip voltage is outputted to the second signal output line 104 via the clip transistor 155 (or is blocked and not outputted). Specifically, when the potential in the judgment output line 152 is HIGH (the high-intensity state), the clip transistor 155 is ON, and the clip voltage is outputted to the second signal output line 104; when the potential in the judgment output line 152 is LO (the normal state), the clip transistor 155 is OFF, and nothing is done to the second signal output line 104. Accordingly, a normal luminance signal is outputted to the second signal output line 104 when in the normal state, and a luminance signal indicating high intensity, or in other words, a clip voltage, is outputted to the second signal output line 104 when in the high-intensity state.

In this manner, with the solid-state imaging device according to the first embodiment, the first signal output line 102 and the high-intensity judgment circuit 140 are connected by capacitive coupling implemented by the judgment input coupling capacitor 145, and therefore only the amount of change in the potential of the first signal output line 102 (signal component that changes at high speed) is inputted into the high-intensity judgment circuit 140; judging the intensity can thus be performed without being affected by DC fluctuations such as drifting and so on. Thus, the intensity can be judged in a stable manner without being affected by variance in the subthreshold current of a bypass transistor. There is no need to adjust the gate voltage of the bypass transistor and optimize the subthreshold current even when the driving frequency, driving timing, and so on are changed. Furthermore, the intensity can be judged without being affected by shifting in the read voltage, variance in the subthreshold current, and so on caused by fluctuations in production processes or the like, and moreover, the range of the luminance signal is not restricted.

In other words, in response to the problem in which black-crush occur in images when strong light enters, according to the solid-state imaging device of the present first embodiment, it is possible to judge the occurrence of black-crush with certainty in a state in which a margin of variance has been secured, without changing the configuration in response to changes in the driving frequency or the like; in addition, it is possible to judge the occurrence of black-crush with certainty in a state in which the dynamic range of signals is maintained even amidst fluctuations in production processes or the like.

Figure 5:
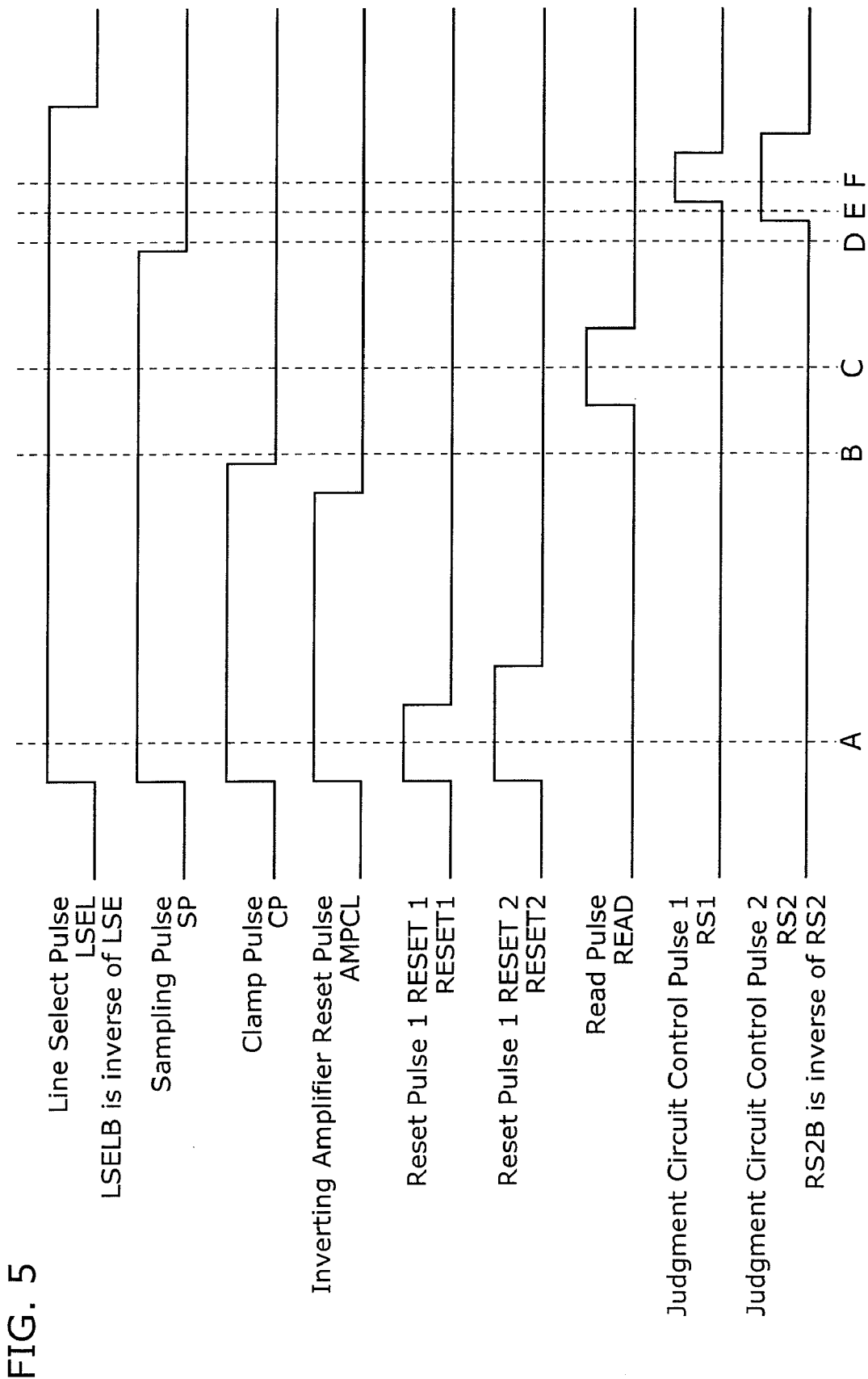
FIG. 5 is a diagram showing another example of timings of control pulses in the solid-state imaging device.

Note that in FIG. 3 of the present first embodiment, the reset pulse RESET is shown as being supplied to the reset transistor 113 and the judgment capacitor reset transistor 151, but the present invention is not limited to such a connection setup. For example, two reset pulses 1 and 2 (RESET 1 and 2), in which ON changes to OFF at different timings, may be generated; the reset pulse 1 (RESET 1) may be supplied to the reset transistor 113, and the reset pulse 2 (RESET 2) may be supplied to the judgment capacitor reset transistor 151, as shown in FIG. 5. In other words, when judging the intensity, a reset for performing the judgment may be carried out in advance, at a timing delayed until after the reset of the photoelectric conversion unit.

Through this, the reset of the judgment input line 146 and the judgment output line 152 is completed slightly after the reset of the capacitor 112 of the pixel circuit 110 is completed; the judgment input line 146 is reset in a state devoid of fluctuation in its potential caused by the capacitive coupling of the judgment input coupling capacitor 145 and the like, and thus judgment of the intensity can be performed in a stable manner.

Second Embodiment

Next, a second embodiment of the present invention shall be described. The present second embodiment is identical to the first embodiment, with the exception of the configuration of the high-intensity judgment circuit. Only the points in which the present embodiment differs from the first embodiment shall be described hereafter.

Figure 6:
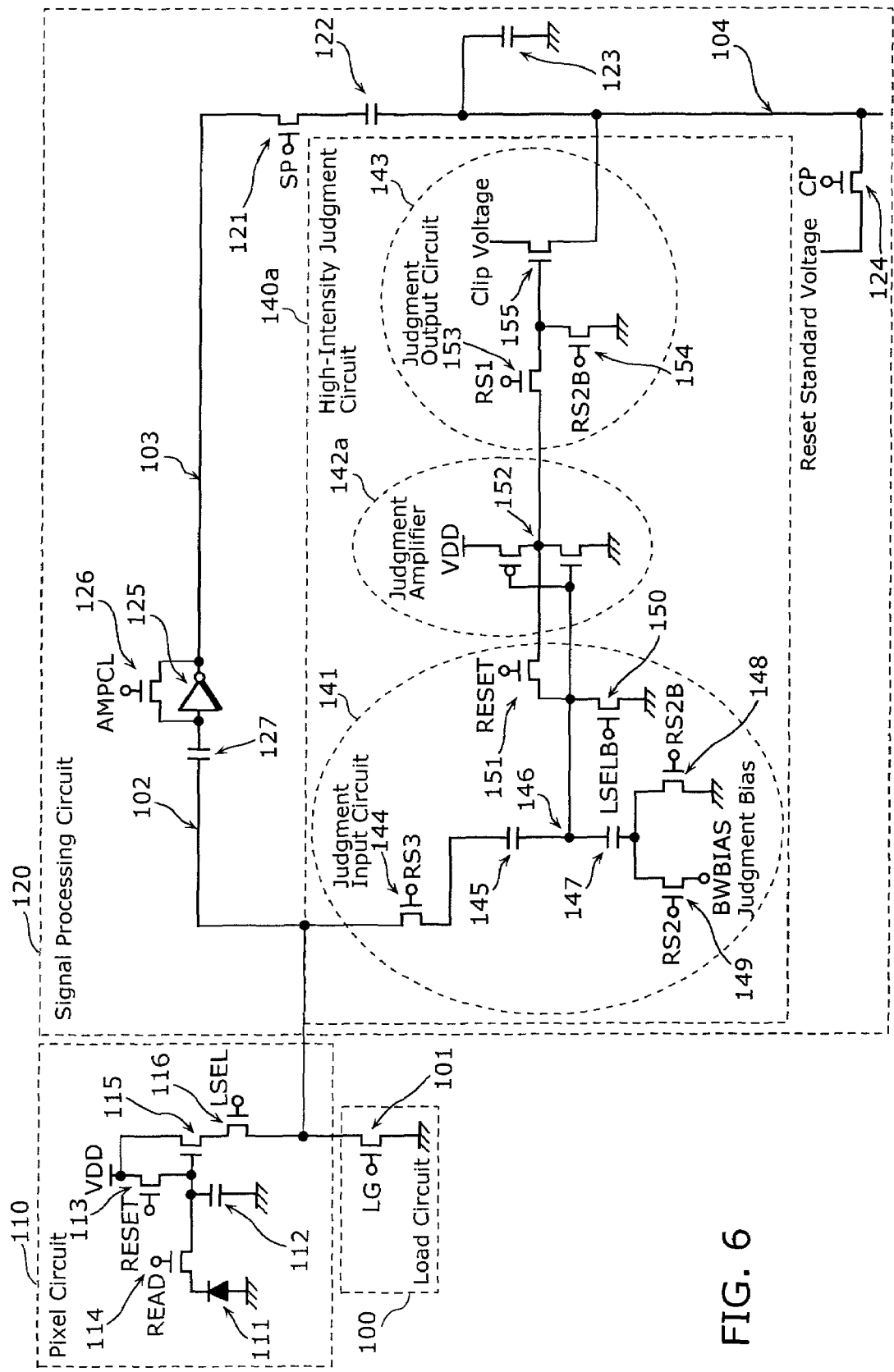
FIG. 6 is a detailed schematic of a solid-state imaging device according to the second embodiment of the present invention.

FIG. 6 is a detailed schematic focusing on one pixel in the solid-state imaging device of the present embodiment. This schematic shows a load circuit 100, a pixel circuit 110, and a signal processing circuit 120 (which includes an intensity detection circuit 140a). Most of these circuits are configured of NMOS transistors; however, some of the circuits (a judgment amplifier 142a) include a PMOS transistor (in other words, are configured of a CMOS).

The high-intensity judgment circuit 140a is configured of a judgment input circuit 141, the judgment amplifier 142a, and a judgment output circuit 143.

As opposed to the first embodiment, a judgment circuit control pulse 3 (RS3), which is a third judgment circuit control pulse having a timing different than that of the judgment circuit control pulse 1 (RS1) and the judgment circuit control pulse 2 (RS2), is supplied to the gate of an input switch transistor 144, which is included in the judgment input circuit 141.

The judgment amplifier 142a is functionally identical to the judgment amplifier 142 of the first embodiment, but is, in the present embodiment, configured of a PMOS transistor and an NMOS transistor connected in series (in other words, a CMOS). The judgment amplifier 142a is identical to the judgment amplifier of the first embodiment in that it functions as a comparator; however, as it is configured of a CMOS, the judgment threshold can be set at VDD/2, which makes it possible to judge whether light entering the device is in the normal state or the high-intensity state over a wider dynamic range.

Figure 7:
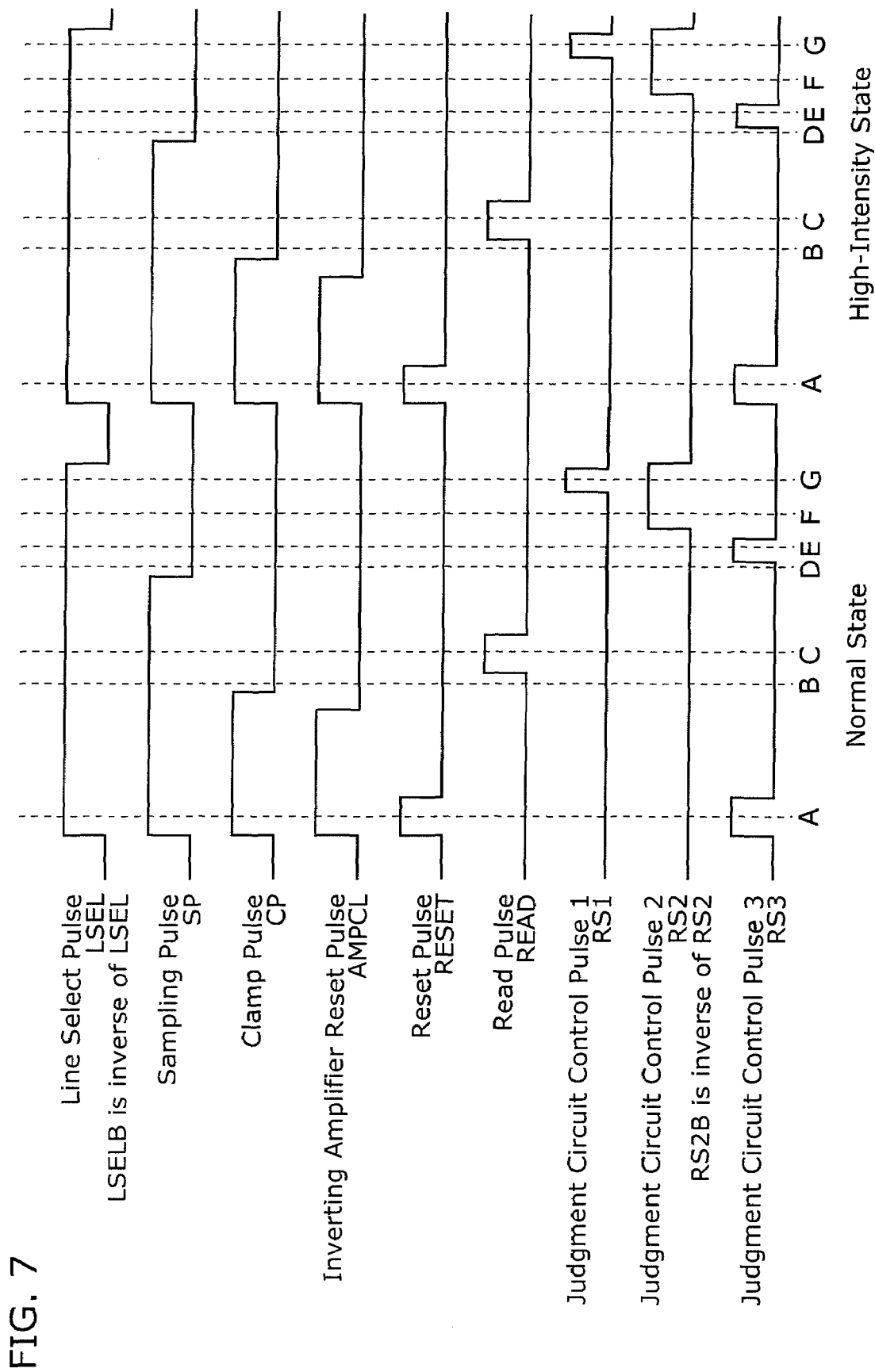
FIG. 7 is a diagram showing timings of control pulses in the solid-state imaging device.

FIG. 7 is a diagram showing the timing of signals which control the circuits (control pulses) shown in FIG. 6. When compared with FIG. 3 in the first embodiment, it can be seen that the timing of the judgment circuit control pulse 3 (RS3) has been added.

The judgment circuit control pulse 3 (RS3) is supplied to the gate of the input switch transistor 144 of the judgment input circuit 141. The judgment circuit control pulse 3 (RS3) is a control signal for causing the signal of the first signal output line 102 to be transferred to the judgment input line 146 via the judgment input coupling capacitor 145.

Figure 8:
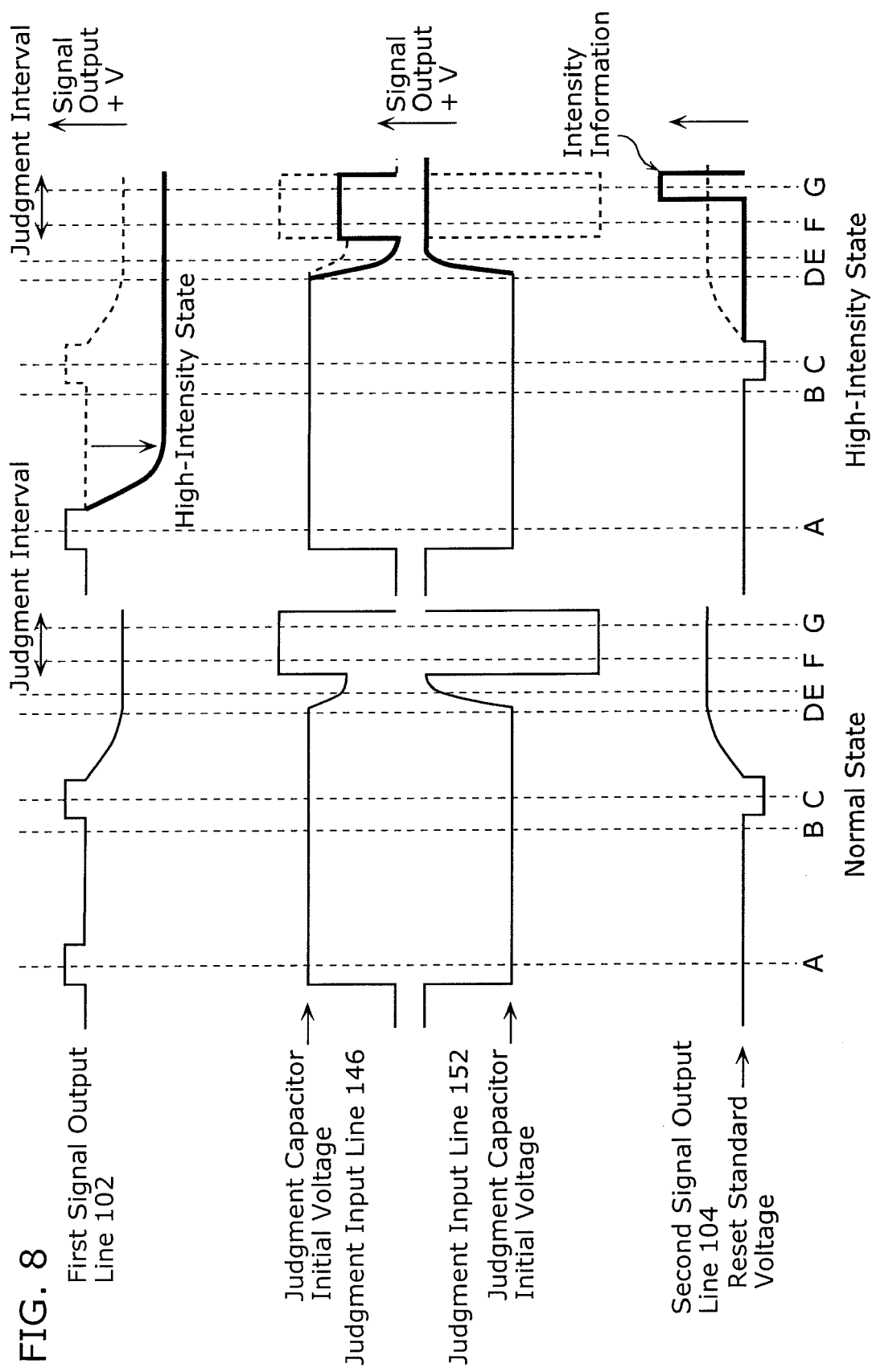
FIG. 8 is a diagram showing signal waveforms occurring in the principle areas of the solid-state imaging device.

FIG. 8 is a diagram showing signal waveforms occurring in the principle areas of the solid-state imaging device. In this diagram, a signal waveform found in the normal state ("normal state signal output") is shown on the left side of the diagram, whereas a signal waveform found in the high-intensity state ("high-intensity signal output") is shown on the right side of the diagram. Note that operations occurring in timings A and E to G differ from those of the first embodiment shown in FIG. 4. Only the operations in the timings different from those described in the first embodiment shall be described hereafter.

In timing A, the capacitor 112 of the pixel circuit 110 is reset to its initial state via the reset transistor 113, and the judgment input line 146 and the judgment output line 152 of the judgment capacitor reset transistor 151 are reset to their respective initial states, due to the reset pulse RESET being HIGH and the judgment circuit control pulse RS3 being HIGH.

In timing E, a decrease in the potential in the first signal output line 102 is transferred at high speed to the judgment input line 146 via the input switch transistor 144 and the judgment input coupling capacitor 145, due to the judgment circuit control pulse RS3 once again being HIGH. Immediately after this, the judgment circuit control pulse RS3 becomes LOW, and the connection between the first signal output line 102 and the judgment input line 146 is broken. This is to prevent fluctuation in the output potential of the light-receiving element 111 from causing, through the capacitive coupling, the potential of the judgment input line 146 to fluctuate.

In timing F, a judgment bias voltage BWBIAS is applied to the judgment input line 146 via the judgment bias input switch transistor 149 and the judgment bias coupling capacitor 147, due to the judgment circuit control pulse RS2 being HIGH; the potential of the post-application judgment input line 146 is compared with a threshold of the judgment amplifier 142a, and whether the light entering the device is in the normal state or the high-intensity state is judged thereby. At this time, when the judgment bias voltage BWBIAS is applied to the judgment input line 146, the potential of the first signal output line 102 is caused to fluctuate, and furthermore, the connection between the first signal output line 102 and the judgment input line 146 is broken so that the accumulated electric loads of other light-receiving elements 111 are not caused to fluctuate due to the capacitive coupling; that is, the input switch transistor 144 is set to OFF by the judgment circuit control pulse RS3.

In timing G, the potential of the judgment output line 152 (the judgment result) is transferred to the clip transistor 155 via the output switch transistor 153 due to the judgment circuit control pulse 1 (RS1) being HIGH, and the clip voltage is outputted to the second signal output line 104 via the clip transistor 155 (or is blocked and not outputted). Specifically, when the potential in the judgment output line 152 is HIGH (the high-intensity state), the clip transistor 155 is ON, and the clip voltage is outputted to the second signal output line 104; when the potential in the judgment output line 152 is LO (the normal state), the clip transistor 155 is OFF, and nothing is done to the second signal output line 104. Accordingly, a normal luminance signal is outputted to the second signal output line 104 when in the normal state, and a luminance signal indicating high intensity, or in other words, a clip voltage, is outputted to the second signal output line 104 when in the high-intensity state.

In this manner, with the solid-state imaging device according to the second embodiment, the first signal output line 102 and the high-intensity judgment circuit 140a are connected by capacitive coupling implemented by the judgment input coupling capacitor 145, and therefore only the amount of change in the potential of the first signal output line 102 (signal component that changes at high speed) is inputted into the high-intensity judgment circuit 140a; judging the intensity can thus be performed without being affected by DC fluctuations such as drifting and so on. Thus, the intensity can be judged in a stable manner without being affected by variance in the subthreshold current of a bypass transistor. There is no need to correct the gate voltage of the bypass transistor and optimize the subthreshold current even when the driving frequency, driving timing, and so on are changed. Furthermore, the intensity can be judged without being affected by shifting in the read voltage, variance in the subthreshold current, and so on caused by fluctuations in production processes or the like, and moreover, the range of the luminance signal is not restricted.

In other words, in response to the problem in which black-crush occurs in images when strong light enters, according to the solid-state imaging device of the present second embodiment, it is possible to judge the occurrence of black-crush with certainty in a state in which a margin of variance has been secured, without changing the configuration in response to changes in the driving frequency or the like; in addition, it is possible to judge the occurrence of black-crush with certainty in a state in which the dynamic range of signals is maintained even amidst fluctuations in production processes or the like.

In addition, in the present second embodiment, the judgment circuit control pulse 3 (RS3), which is a third judgment circuit control pulse with a timing different from that of the judgment circuit control pulse 1 (RS1) and the judgment circuit control pulse 2 (RS2), is supplied to the gate of the input switch transistor 144, which prevents fluctuation in the output potential of the light-receiving element 111 from causing, through the capacitive coupling, the potential of the judgment input line 146 to fluctuate; therefore, the judgment amplifier 142a can perform judgment of the normal state or the high-intensity state in a more stable manner.

Furthermore, the judgment amplifier 142a is configured of a CMOS; this makes it possible to conserve energy, and also make it possible to set the judgment threshold to VDD/2, which allows judgment of the normal state or the high-intensity state to be performed over a wider dynamic range.

Third Embodiment

Next, a third embodiment of the present invention shall be described. The present third embodiment features the same circuit configuration as that of the second embodiment; however, the driving timing of the solid-state imaging device differs from that of the second embodiment. Only the points in which the present embodiment differs from the second embodiment shall be described hereafter.

In the second embodiment, judgment of whether the light entering the device is in the normal state or the high-intensity state is performed after a difference signal indicating the difference between the reset potential (the potential of the capacitor 112 in timing B) and the read potential (the potential of the capacitor 112 in timing C) is accumulated in the sampling capacitor 123. However, in the present third embodiment, judgment of whether the light entering the device is in the normal state or the high-intensity state is performed simultaneously with the accumulation of the difference signal, and through this, the driving timing is reduced.

Figure 9:
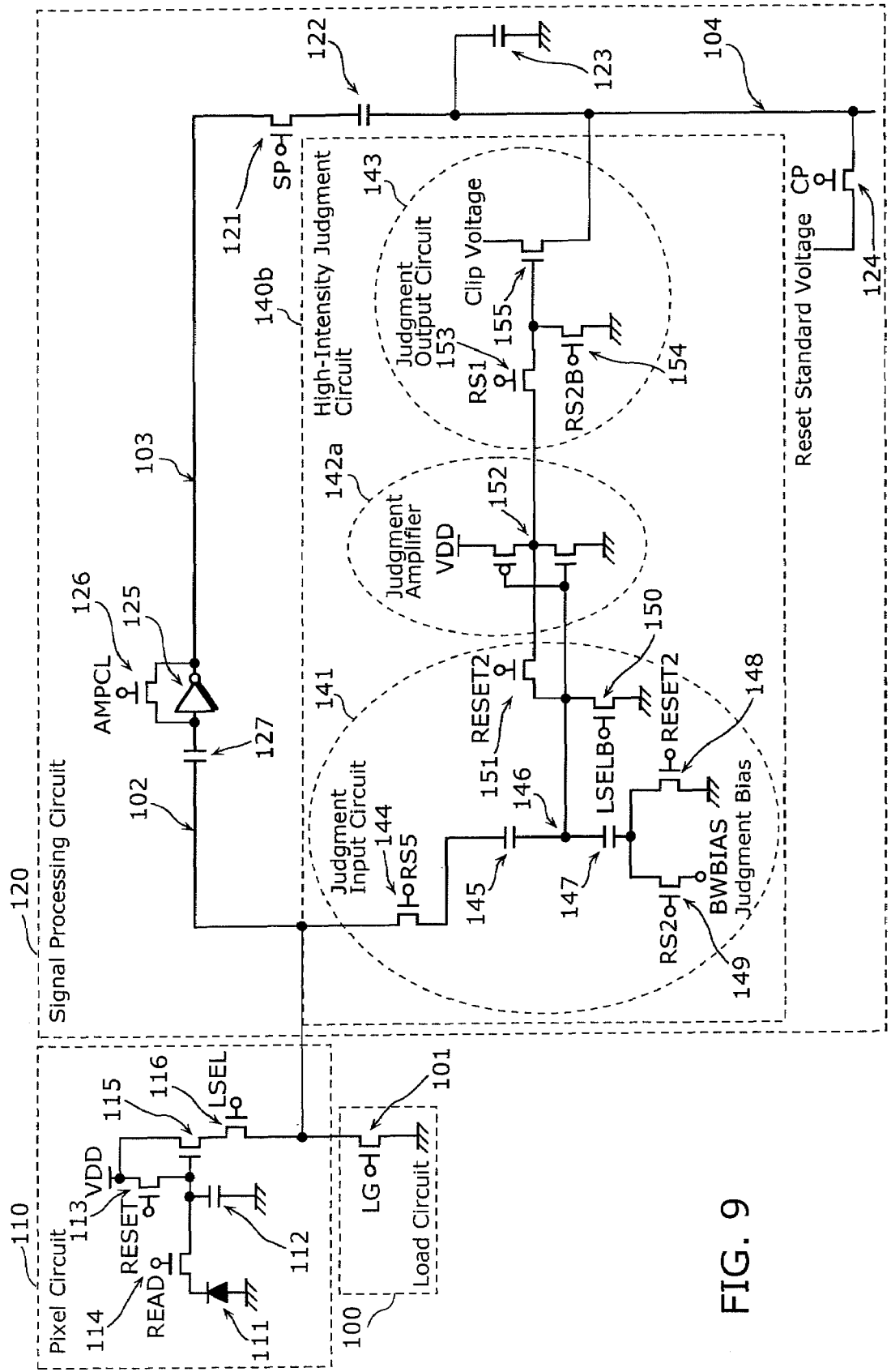
FIG. 9 is a detailed schematic of a solid-state imaging device according to the third embodiment of the present invention.

FIG. 9 is a detailed schematic focusing on one pixel in the solid-state imaging device of the present embodiment. This schematic shows a load circuit 100, a pixel circuit 110, and a signal processing circuit 120 (which includes an intensity detection circuit 140b). The configuration of this circuit is identical to that of the second embodiment; however, the control pulses supplied to the gates of the input switch transistor 144, judgment standby switch transistor 148, and judgment capacitor reset transistor 151 that make up the high-intensity judgment circuit 140b are different.

A judgment circuit control pulse 5 (RS5), which is a judgment circuit control pulse having a different timing from the judgment circuit control pulses 1 to 3 (RS1 to RS3) in the second embodiment, is supplied to the gate of an input switch transistor 144, which is included in the judgment input circuit 141.

A second reset pulse RESET 2 is supplied to the gates of the judgment standby switch transistor 148 and judgment capacitor reset transistor 151, which are included in the judgment input circuit 141.

Note that the transistors to which the judgment circuit control pulse 1 (RS1) and the judgment circuit control pulse 2 (RS2) are supplied are the same as in the second embodiment; however, as shall be described later, the waveforms (pulse timings) differ from those in the second embodiment.

Figure 10:
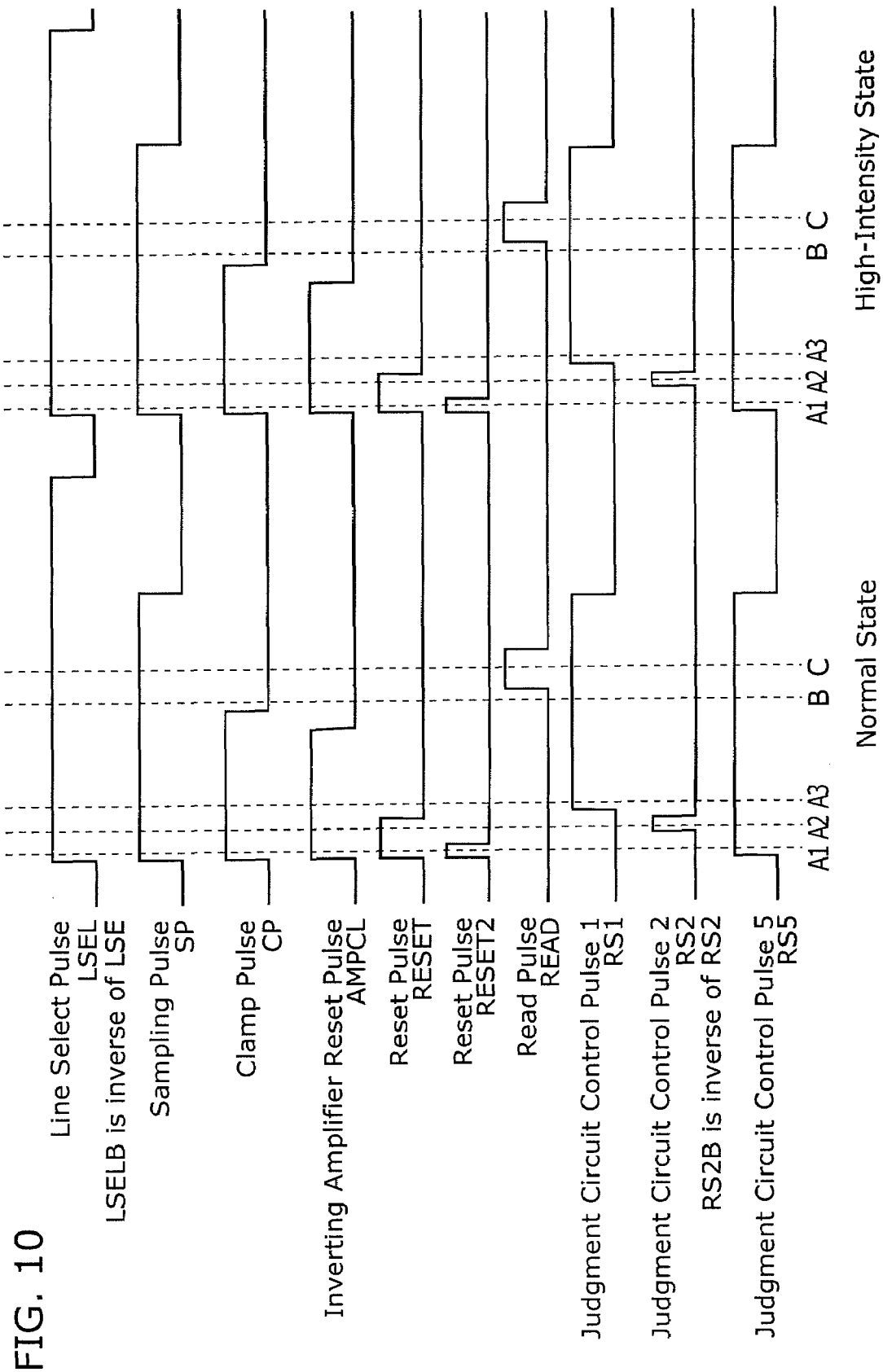
FIG. 10 is a diagram showing timings of control pulses in the solid-state imaging device.

FIG. 10 is a diagram showing the timing of signals which control the circuits (control pulses) shown in FIG. 9. When compared with FIG. 7 in the second embodiment, it can be seen that the timings of the second reset pulse RESET2 and the judgment circuit control pulse 5 (RS5) have been added, and that the waveforms of the judgment circuit control pulse 1 (RS1) and the judgment circuit control pulse 2 (RS2) differ.

The second reset pulse RESET2 is supplied to the gates of the judgment standby switch transistor 148 and the judgment capacitor reset transistor 151. The second reset pulse RESET2 is a control signal for resetting the judgment input circuit 141 and judgment amplifier 142a of the high-intensity judgment circuit 140b to their respective initial states, during the interval in which the pixel circuit 110 is reset by the reset pulse RESET.

The judgment circuit control pulse 5 (RS5) is supplied to the gate of the input switch transistor 144 in the judgment input circuit 144. The judgment circuit control pulse 5 (RS5) is a control signal for causing the signal of the first signal output line 102 to be transferred to the judgment input line 146 via the judgment input coupling capacitor 145. It is possible to judge whether or not light entering the photoelectric conversion unit is of high intensity in the interval from when the photoelectric conversion unit outputs the reset voltage to the first signal output line 102 to when the photoelectric conversion unit outputs the read voltage to the first signal output line 102.

The judgment circuit control pulse 1 (RS1) is supplied to the gate of the output switch transistor 153 of the judgment output circuit 143. The judgment circuit control pulse 1 (RS1) is a control signal for transferring the result of the judgment performed by the high-intensity judgment circuit 140b to the clip transistor 155. It is possible to output a luminance signal indicating that the light entering the device is of high intensity in the interval from when the photoelectric conversion unit outputs the reset voltage to the first signal output line 102 to when the photoelectric conversion unit outputs the read voltage to the first signal output line 102.

The judgment circuit control pulse 2 (RS2) is supplied to the gate of the judgment bias input switch transistor 149 of the judgment input circuit 141. The judgment circuit control pulse 2 (RS2) is a control signal for causing judgment by the judgment amplifier 142a to occur in the interval in which the pixel circuit 110 is reset due to the reset pulse RESET. Through this, it is possible to judge whether or not light entering the photoelectric conversion unit is of high intensity in the interval in which the photoelectric conversion unit outputs the reset voltage to the first signal output line 102.

Figure 11:
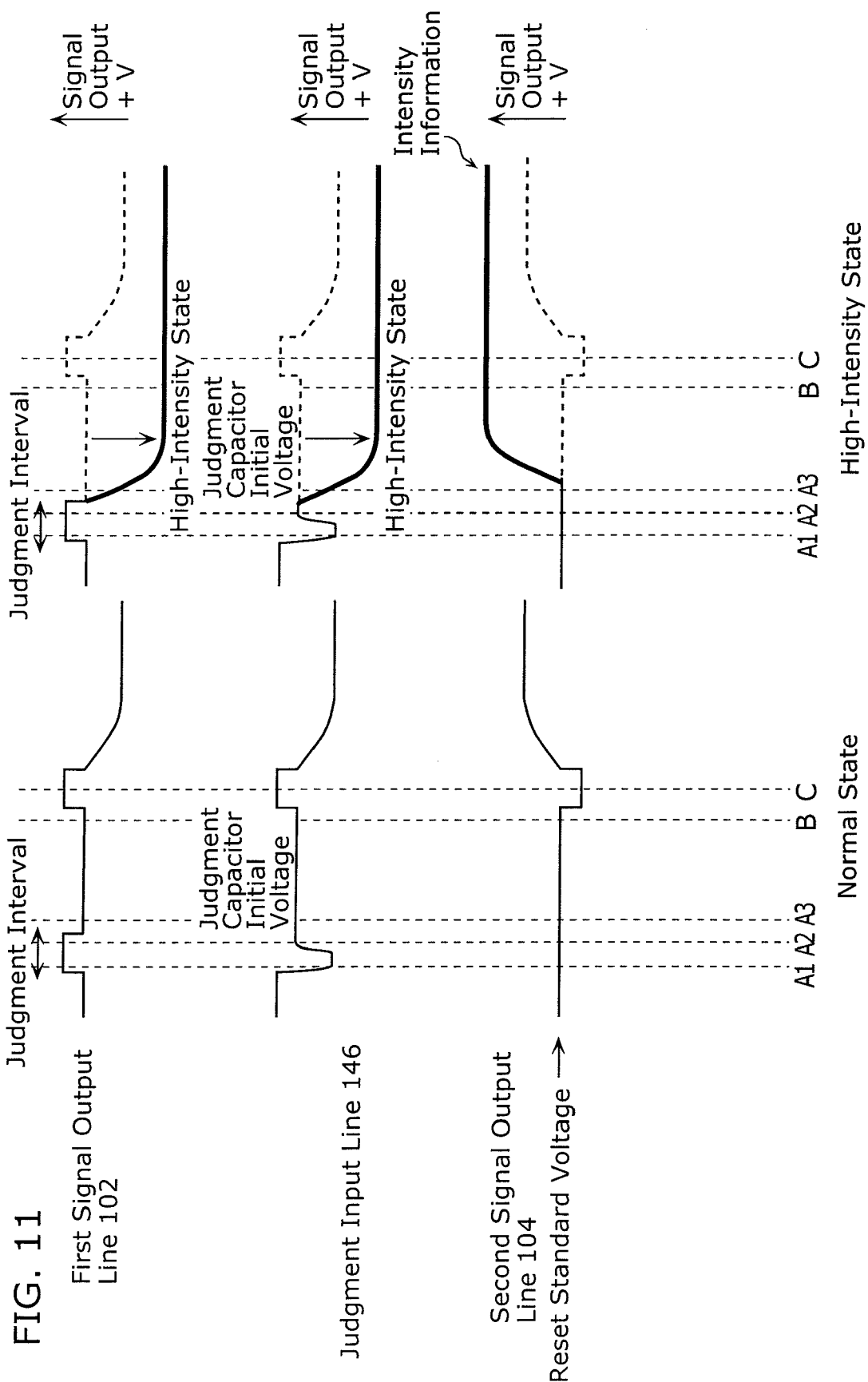
FIG. 11 is a diagram showing signal waveforms occurring in the principle areas of the solid-state imaging device.

FIG. 11 is a diagram showing signal waveforms occurring in the principle areas of the solid-state imaging device. Here, signal waveforms are shown for: the first signal output line 102, which is the output of the pixel circuit 110; the judgment input line 146, which is in the high-intensity judgment circuit 140b; and the second signal output line 104.

In timing A1, the judgment standby switch transistor 148 and the judgment capacitor reset transistor 151 are temporarily conductive, due to the second reset pulse RESET2, which resets the judgment input circuit 141 and the judgment amplifier 142a of the high-intensity judgment circuit 140b to their respective initial states.

In timing A2, the judgment bias input switch transistor 149 is temporarily conductive, due to the judgment circuit control pulse 2 (RS2). A judgment bias voltage is applied to the judgment input line 146 via the judgment bias coupling capacitor 147; the potential of the judgment input line 146 after the application is compared with a threshold of the judgment amplifier 142a, and whether the light entering the device is in the normal state or the high-intensity state is judged thereby.

From timing A3 on, the potential of the judgment output line 152 (the judgment result) is transferred to the clip transistor 155 via the output switch transistor 153 due to the judgment circuit control pulse 1 (RS1) being HIGH, and the clip voltage is outputted to the second signal output line 104 via the clip transistor 155 (or is blocked and not outputted). Accordingly, whether or not light entering the photoelectric conversion unit is of high intensity is judged, and a luminance signal indicating that the light entering the device is of high-intensity is outputted, in the interval from when the photoelectric conversion unit outputs the reset voltage to the first signal output line 102 to when the photoelectric conversion unit outputs the read voltage to the first signal output line 102.

As described above, according to the solid-state imaging device of the present third embodiment, whether or not light entering the photoelectric conversion unit is of high intensity is judged, and a luminance signal indicating that the entering light is of high-intensity is outputted, in the interval from when the photoelectric conversion unit outputs the reset voltage to the first signal output line 102 to when the photoelectric conversion unit outputs the read voltage to the first signal output line 102; therefore, the present third embodiment adds, to the effects of the second embodiment, and effect in that the driving timing is reduced.

Fourth Embodiment

Next, a fourth embodiment of the present invention shall be described. The present fourth embodiment is identical to the first embodiment, with the exception of the configuration of the high-intensity judgment circuit. Only the points in which the present embodiment differs from the first embodiment shall be described hereafter.

In the first embodiment, a judgment amplifier, which judges whether or not the light entering the device is in the high-intensity state and amplifies signals, is necessary. However, in the present fourth embodiment, the high-intensity judgment circuit is configured only of a circuit corresponding to the judgment input circuit and the judgment output circuit. In other words, the present embodiment is a high-intensity judgment circuit which does not have a circuit that corresponds to the judgment amplifier of the first embodiment. Through this, the circuit is simplified and the scale of the circuit is reduced.

Figure 12:
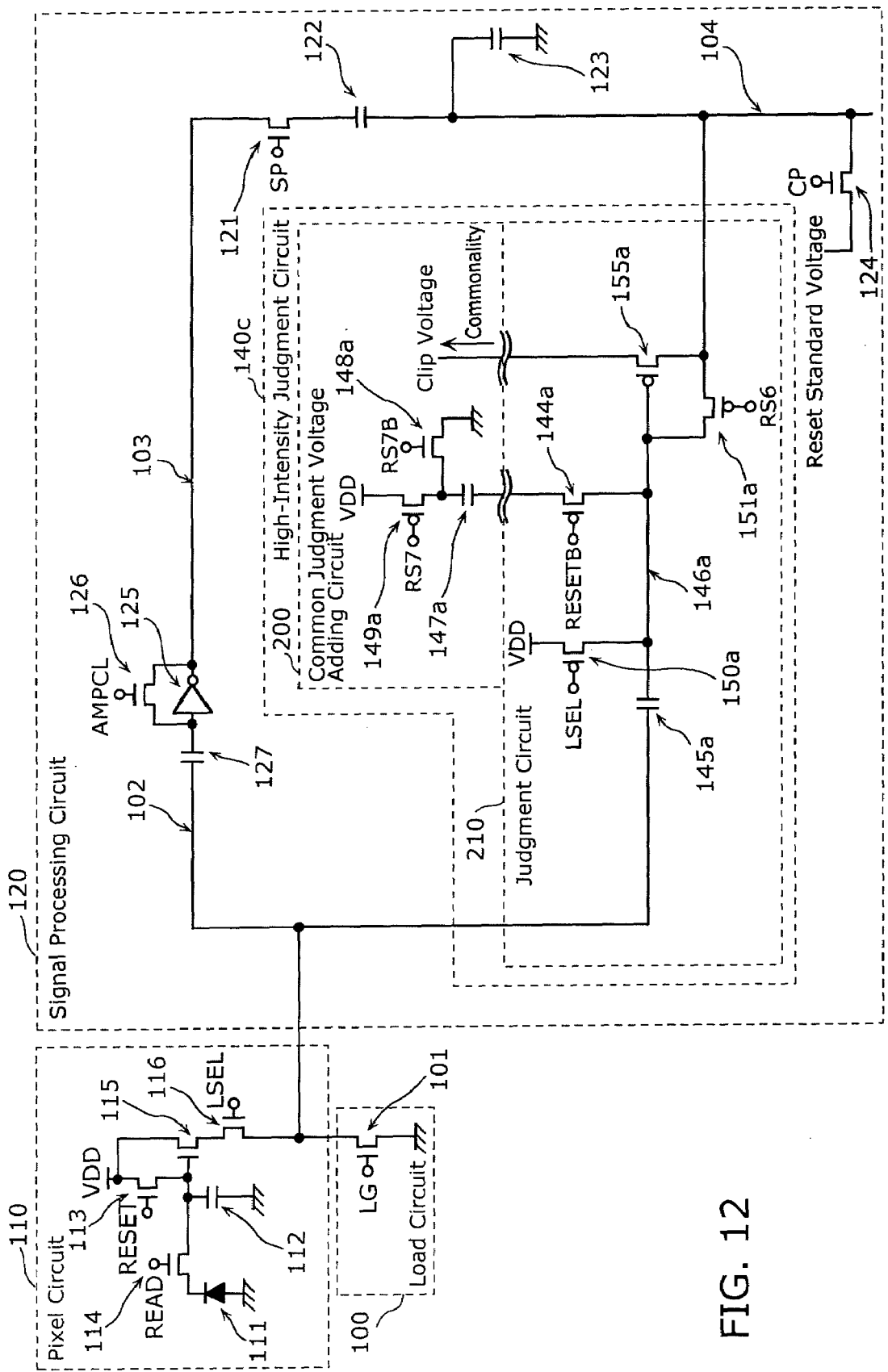
FIG. 12 is a detailed schematic of a solid-state imaging device according to the fourth embodiment of the present invention.

FIG. 12 is a detailed schematic focusing on one pixel in the solid-state imaging device of the present embodiment. The signal processing circuit 120 is configured of a signal output circuit configured identically to that of the first embodiment (all parts of the signal processing circuit 120 with the exception of a high-intensity judgment circuit 140c), and the high-intensity judgment circuit 140c, which has the same function as, but a configuration differing from, the high-intensity judgment circuit of the first embodiment.

The high-intensity judgment circuit 140c can be roughly divided into a judgment circuit 210 and a common judgment voltage adding circuit 200.

The common judgment voltage adding circuit 200 is made up of a judgment bias coupling capacitor 147a, a judgment standby switch transistor 148a, and a judgment bias input switch transistor 149a. The common judgment voltage adding circuit 200 switches between a power source (VDD) and a ground, supplying either potential to a judgment switch transistor 144a via the judgment bias coupling capacitor 147a, along with supplying a clip voltage to a clip transistor 155a.

The judgment circuit 210 is a circuit which outputs a luminance signal indicating that the light entering the device is of high intensity to the second signal output line 104 in the case where the difference between the reset voltage and the read voltage outputted from the pixel circuit 110 to the first signal output line 102 exceeds a predetermined range. The judgment circuit 210 has a characteristic of capturing the AC component of a signal in the first signal output line 102 at high speed, via capacitive coupling, and includes: a judgment input coupling capacitor 145a, which transfers the potential of the first signal output line 102 to the judgment input line 146a; a judgment input line 146a; a standby switch transistor 150a which causes the judgment input line 146 to connect to the power source in order to stop the judgment function; a judgment switch transistor 144a which cuts application of an adding voltage sent from the common judgment voltage adding circuit 200 to the judgment input line 146a; a clip transistor 155a which outputs a clip voltage to the second signal output line 104; and a judgment capacitor reset transistor 151a which resets the clip transistor 155a to its initial state.

Note that in the present embodiment, the judgment switch transistor 144a, judgment bias input switch transistor 149a, standby switch transistor 150a, judgment capacitor reset transistor 151a, and clip transistor 155a are configured of PMOS transistors.

Note that the judgment bias coupling capacitor 147a, judgment standby switch transistor 148a, and judgment bias input switch transistor 149a of the common judgment voltage adding circuit 200 make up a bias voltage adding circuit which adds a constant voltage to the judgment input line 146 via the judgment bias coupling capacitor 147, and may be configured of a circuit provided in the signal processing unit 5 shown in FIG. 1 and common to all columns, rather than being provided per vertical column of unit cells.

The clip transistor 155a is set so as to have a threshold through a reset (temporary conductivity) performed by the judgment capacitor reset transistor 151a. After a constant voltage has been added by the common judgment voltage adding circuit 200, the abovementioned threshold value is compared with an amount of fluctuation in the signal potential on the judgment input line 146 occurring in the interval when a reset potential, in which the initial voltage of the 110 is amplified, and a read voltage, in which the readout voltage of the pixel circuit 102 is amplified, are outputted to the first signal output line 102. Through this comparison, it is judged whether the light entering the device is in the "high-intensity state" or in the "normal state," and a clip voltage is outputted (or not outputted) to the signal output line 104 based on the result of the judgment.

To be more specific, in the case where the voltage of the judgment input line 146a is lower than the threshold of the clip transistor 155a (the high-intensity state), the clip transistor 155a is set to ON, and a luminance signal indicating high-intensity (a clip voltage) is outputted to the second signal output line 104, rather than using the luminance signal in the second signal output line 104. On the other hand, in the case where the voltage of the judgment input line 146a is higher than the threshold of the clip transistor 155a (the normal state), the clip transistor 155a is set to OFF, and as a result, the luminance signal is held in the second signal output line 104 as-is.

Figure 13:
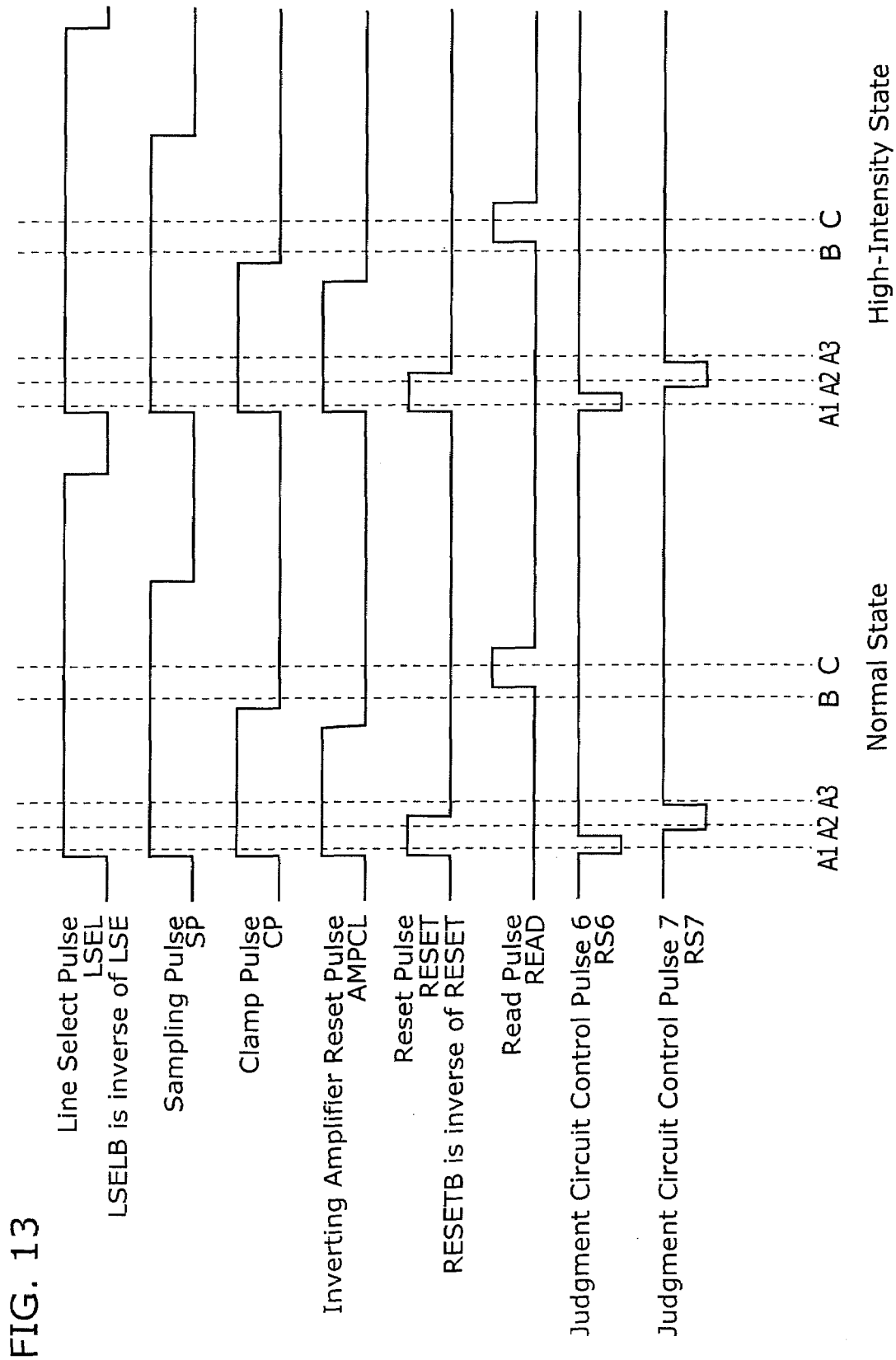
FIG. 13 is a diagram showing timings of control pulses in the solid-state imaging device.

FIG. 13 is a diagram showing the timing of signals which control the circuits (control pulses) shown in FIG. 12. When compared with FIG. 3 in the first embodiment, it can be seen that the timings of judgment circuit control pulses 6 and 7 (RS6 and RS7) are present instead of the judgment circuit control pulses 1 and 2 (RS1 and RS2).

The judgment circuit control pulse 6 (RS6) is supplied to the gate of the judgment capacitor reset transistor 151a, and is a control signal for setting the threshold of the clip transistor 155a by resetting the clip transistor 155a in timing A1.

The judgment circuit control pulse 7 (RS7) and its inverted pulse (RS7B) are respectively supplied to the gates of the judgment bias input switch transistor 149a and judgment standby switch transistor 148a; in timing A2, by setting the judgment standby switch transistor 148a to OFF and the judgment bias input switch transistor 149a to ON, a power voltage is applied to the judgment input line 146a via the judgment bias coupling capacitor 147a and judgment switch transistor 144a and the potential of the judgment input line 146a is increased. The judgment circuit control pulse 7 (RS7) and its inverted pulse (RS7B) are control signals for setting the clip transistor 155a to OFF through this operation.

Figure 14:
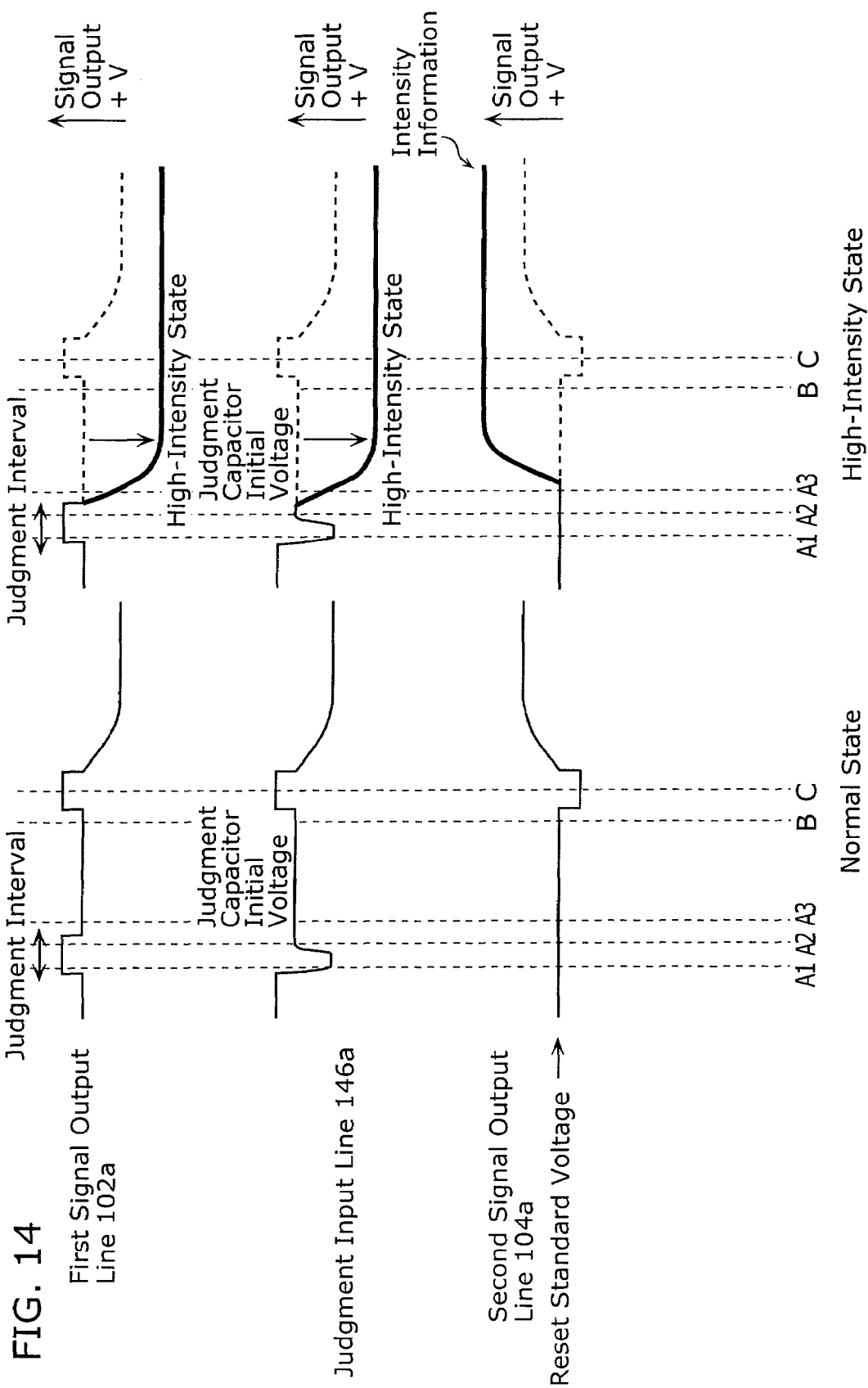
FIG. 14 is a diagram showing signal waveforms occurring in the principle areas of the solid-state imaging device.

FIG. 14 is a diagram showing signal waveforms occurring in the principle areas of the solid-state imaging device. Here, signal waveforms are shown for: the first signal output line 102a, which is the output of the pixel circuit 110; the judgment input line 146a, which is in the high-intensity judgment circuit 140c; and the second signal output line 104.

In timing A1, the judgment capacitor reset transistor 151a is caused by the judgment circuit control pulse 6 (RS6) to be temporarily conductive, and accordingly, the clip transistor 155a is reset and the threshold thereof is set.

In timing A2, the judgment circuit control pulse 7 (RS7) and its inverted pulse (RS7B) are respectively supplied to the gates of the judgment bias input switch transistor 149a and judgment standby switch transistor 148a, and thereby, the judgment standby switch transistor 148a is set to OFF, while the judgment bias input switch transistor 149a is set to ON. Through this, the power voltage (VDD) is applied to the judgment input line 146a via the judgment bias coupling capacitor 147a and the judgment switch transistor 144a, and the clip transistor 155a is set to OFF.

Finally, from timing A3 on, when the light entering the device is in the high-intensity state, the potential of the first signal output line 102 drops, and the clip transistor 155a is set to ON when its threshold is exceeded; as a result, a luminance signal indicating high intensity (a clip voltage) is outputted to the second signal output line 104.

In this manner, with the solid-state imaging device according to the fourth embodiment, the first signal output line 102 and the high-intensity judgment circuit 140c are connected by capacitive coupling implemented by the judgment input coupling capacitor 145a, and therefore only the amount of change in the potential of the first signal output line 102 (signal component that changes at high speed) is inputted into the high-intensity judgment circuit 140c; judging the intensity can thus be performed without being affected by DC fluctuations such as drifting and so on. Thus, the intensity can be judged in a stable manner without being affected by variance in the subthreshold current of a bypass transistor. There is no need to correct the gate voltage of the bypass transistor and optimize the subthreshold current even when the driving frequency, driving timing, and so on are changed. Furthermore, the intensity can be judged without being affected by shifting in the read voltage, variance in the subthreshold current, and so on caused by fluctuations in production processes or the like, and moreover, the range of the luminance signal is not restricted.

Furthermore, in the high-intensity judgment circuit 140c of the present fourth embodiment, there is no circuit corresponding to the judgment amplifier provided in the first embodiment, and thus it is possible to simplify the circuit and reduce the scale of the circuit by that amount.

Fifth Embodiment

Next, a fifth embodiment of the present invention shall be described. The present fifth embodiment is identical to the second embodiment, with the exception of the manner in which some parts included in the high-intensity judgment circuit are connected. Only the points in which the present embodiment differs from the second embodiment shall be described hereafter.

In the judgment input circuit 141 of the high-intensity judgment circuit in the second embodiment, the voltage signal of the first signal output line 102 is capacitively divided by the judgment input coupling capacitor 145 and the judgment bias coupling capacitor 147, and the resulting voltage signal is inputted into the judgment amplifier 142a via the judgment input line. In the present embodiment, the voltage signal of the first signal output line 102 is inputted into the judgment amplifier 142a of the judgment input line without being capacitively divided. Through this, the voltage signal of the first signal output line 102 being transferred to the judgment input line 146 in a dampened state can be avoided.

Figure 15:
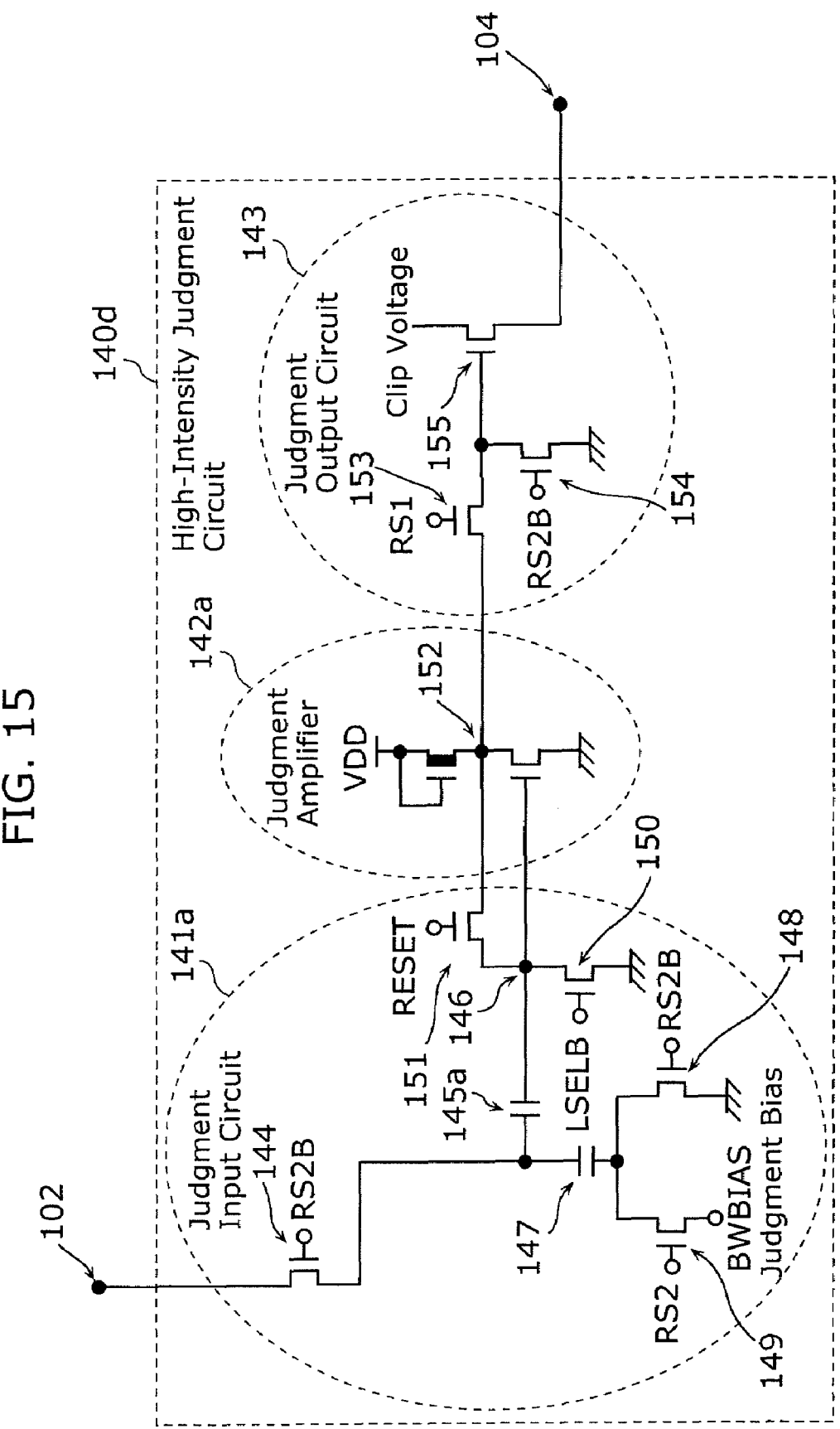
FIG. 15 is a detailed schematic of a solid-state imaging device according to the fifth embodiment of the present invention.

FIG. 15 is a detailed schematic focusing on one pixel in the solid-state imaging device of the present embodiment. Only a high-intensity judgment circuit 140d is shown here.

The only difference between the high-intensity judgment circuit 140d and the high-intensity judgment circuit 140a of the second embodiment is connections in the judgment input circuit 141. In other words, in the second embodiment, the judgment bias coupling capacitor 147 is connected to the judgment input line 146; however, in the present embodiment, the judgment bias coupling capacitor 147 is connected to a connection point which connects the input switch transistor 144 and the judgment input coupling capacitor 145a. To put it differently, in the second embodiment, the voltage signal from the first signal output line 102 that passes through the input switch transistor 144 (the difference signal between the reset voltage and the read voltage) is capacitatively divided by the judgment input coupling capacitor 145 and the judgment bias coupling capacitor 147, and the post-division voltage signal is inputted into the judgment amplifier 142a via the judgment input line 146. However, in the present embodiment, the voltage signal from the first signal output line 102 that passes through the input switch transistor 144 is directly supplied to the judgment bias coupling capacitor 147, and is inputted into the judgment amplifier 142a via the judgment input coupling capacitor 145a and the judgment input line 146.

Through such a connection setup, according to the high-intensity judgment circuit 140d in the present embodiment, dampening of the difference signal between the reset voltage and the read voltage outputted from the pixel circuit 110 to the first signal output line 102 caused by the capacitive division can be avoided; the difference signal can be compared to the threshold in its undampened state in the judgment amplifier 142a, and thus whether or not the light entering the device is in the high-intensity state can be judged with high accuracy.

Thus far, the solid-state imaging device according to the present invention has been described based on several exemplary embodiments, but it should be noted that the present invention is not limited to these exemplary embodiments. For example, variations on the embodiments implemented by one skilled in the art, variations implemented by combining arbitrary parts of the embodiments, and so on can all be considered to fall within the scope of the present invention as long as they do not deviate from the essence of the present invention.

Figure 16:
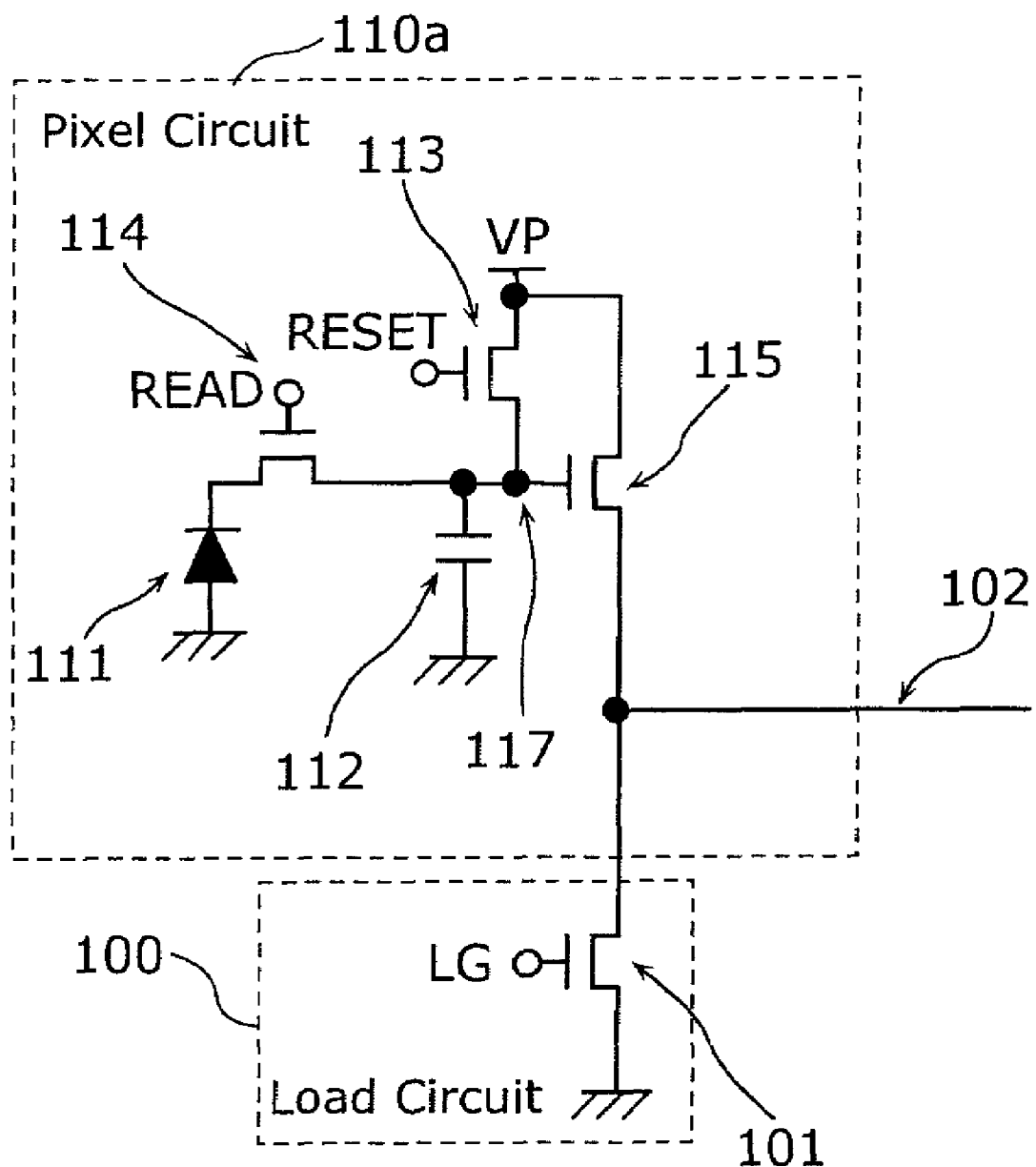
FIG. 16 is a schematic showing another example of an imaging circuit.

For example, the pixel circuit is configured of four transistors in the above embodiments, but the pixel circuit may be configured of three transistors, as shown in FIG. 16. The pixel circuit 110a shown in FIG. 16 does not include the line select transistor 116 provided in the above embodiments. As opposed to the pixel circuit 110 in the above embodiments, the pixel circuit 110a modulates a pixel power source (VP) and performs line selection by selecting/deselecting a gate potential of the amplification transistor 115 via the reset transistor 113. In the case where the line select modulation is small, it is difficult to secure a dynamic range in the first signal output line 102, and the luminance signal outputted to the first signal output line 102 (the difference between the reset voltage and the read voltage) decreases; however, if the high-intensity judgment circuit is a high-intensity judgment circuit according to the above embodiments, whether or not the light entering the device is in the high-intensity state is judged based on the AC component of the luminance signal, and thus such a pixel circuit 110a is applicable as well. In particular, the high-intensity judgment circuit 140d according to the fifth embodiment accurately judges whether or not the light entering the device is in the high-intensity state without the signal outputted from the first signal output line 102 being dampened, and thus is well-suited to the pixel circuit 110a.

Figure 17:
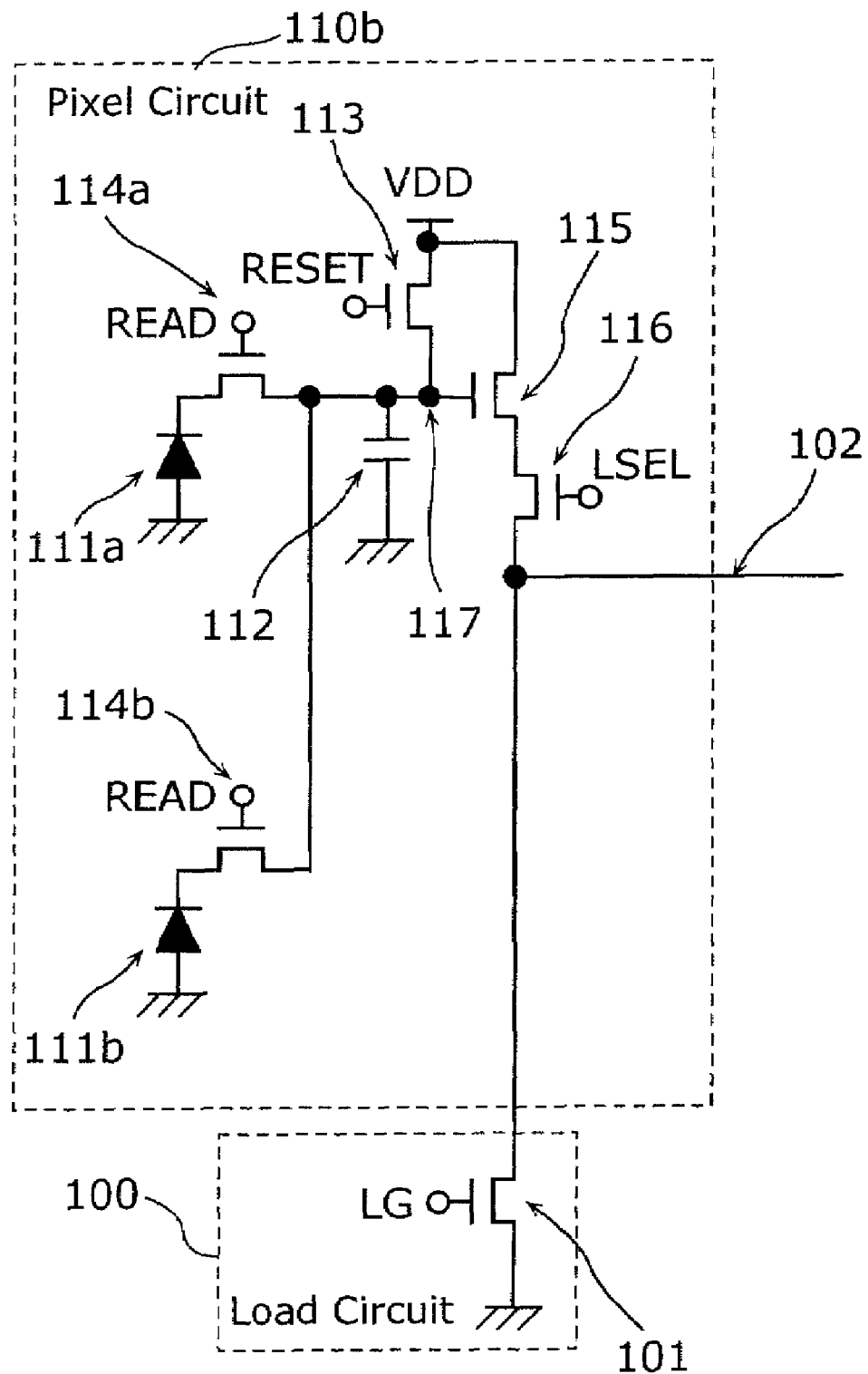
FIG. 17 is a schematic showing yet another example of an imaging circuit.

Moreover, in the above embodiments, one pixel circuit is provided for each light-receiving element 111; however, one pixel circuit may be provided for plural light-receiving elements 111a and 111b, as shown in FIG. 17. As opposed to the pixel circuit 110 in the above embodiments, which is a single-pixel cell, in this pixel circuit 110b, which is a multi-pixel cell, read transistors 114a and 114b are respectively provided for the two light-receiving elements 111a and 111b, and furthermore, a capacitor 112, a reset transistor 113, a amplification transistor 115, and a line select transistor 116 are provided in common for the light-receiving elements 111a and 111b. According to such a pixel circuit 110b, while there is an increase in the luminance signal due to the increase in the number of light-receiving elements, there is no change in the dynamic range in the first signal output line 102 caused by the VDD (power voltage), and therefore a margin, which is the difference between the dynamic range and the luminance signal, decreases; however, if the high-intensity judgment circuit is a high-intensity judgment circuit according to the above embodiments, whether or not the light entering the device is in the high-intensity state is judged based on the AC component of the luminance signal, the normal or high-intensity states can be judged with certainty, without being influenced by the decrease in the margin.

In addition, in the above embodiments, a solid-state imaging device according to the present invention has been described; however, it should be noted that the present invention is not limited only to a solid-state imaging device, and includes within its scope an imaging camera which includes the solid-state imaging device according to the above embodiments.

Figure 18:
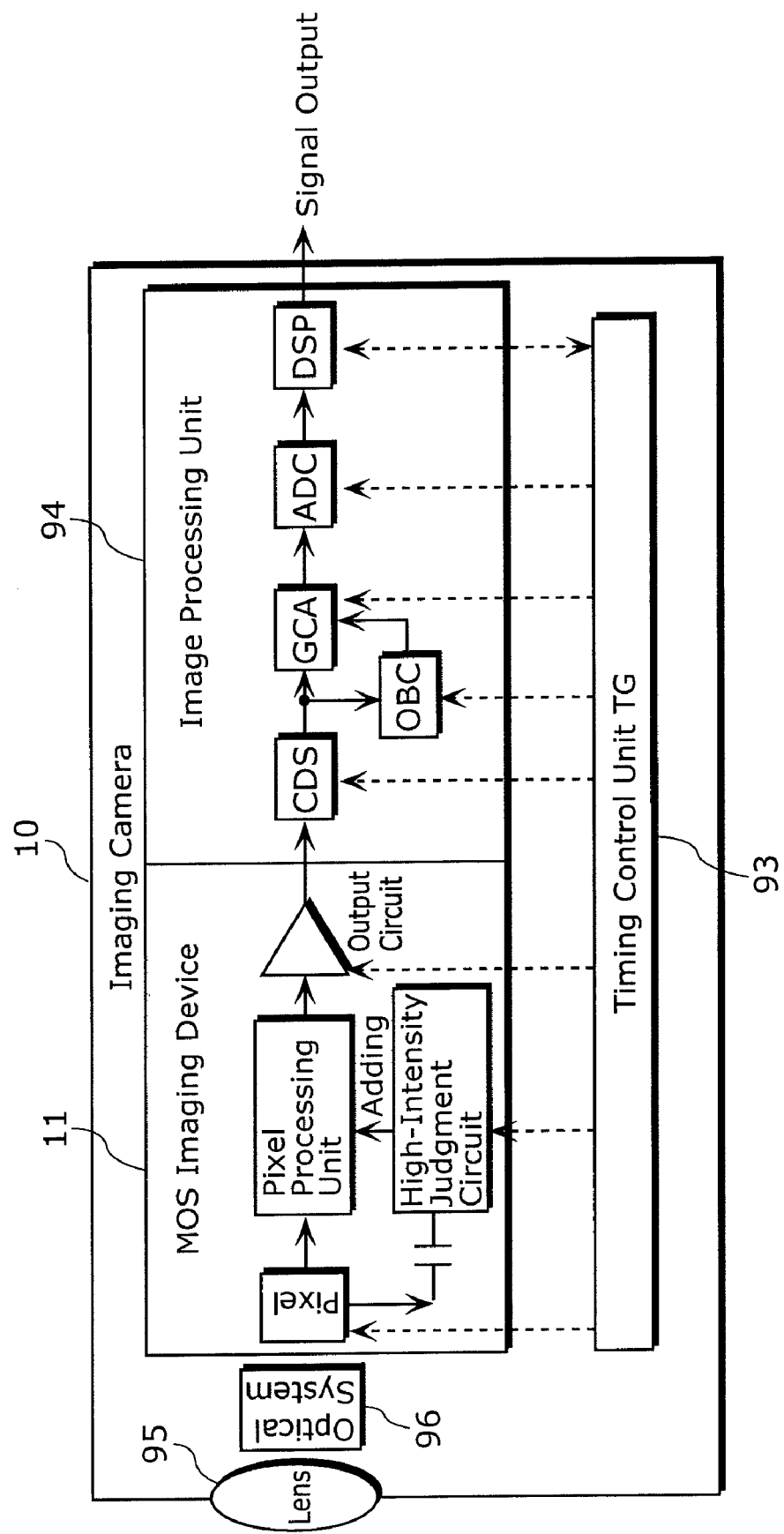
FIG. 18 is a block diagram showing a configuration of an imaging camera according to the present invention.

FIG. 18 is a block diagram showing a configuration of an imaging camera 10 according to the present invention. The imaging camera 10 is an imaging device that can, for example, capture still images, and includes: a MOS imaging device 11, a timing control unit 93 which supplies a control signal to the MOS imaging device 11 and drives/controls the MOS imaging device 11; an image processing unit 94 which processes a signal load (luminance signal) outputted from the MOS imaging device, generates an image, and stores the image; a lens 95; and an optical system 96. The MOS imaging device 11 has a characteristic in that it has a high-intensity judgment circuit connected from a pixel (the pixel circuit 110) via a capacitor. Note that the MOS imaging device 11 is disposed in a position so that light passing through a light shielding device forms an image. The MOS imaging device 11 is a semiconductor element and surrounding circuit in which a plural number of unit cells which output a signal load (luminance signal) in accordance with an amount of received light are arranged, and corresponds to the solid-state imaging device of the abovementioned first through fifth embodiments.

In addition, the present invention may be implemented as a multi-chip semiconductor integrated circuit, a single-chip semiconductor integrated circuit, or the like. For example, the MOS imaging device 11 in FIG. 18 alone may be implemented as a single-chip semiconductor integrated circuit, or, alternatively, the MOS imaging device 11, the timing control unit 93, and the image processing unit 94 may be implemented as a single-chip semiconductor integrated circuit.

Moreover, the present invention may be implemented not only as a solid-state imaging device and an imaging camera, but also as a driving method for a solid-state imaging device which utilizes the timing control unit 93 and so on to supply various control pulses to the solid-state imaging device.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The solid-state imaging device according to the present invention is applicable as an image sensor in an imaging device; more particularly, as the solid-state imaging device according to the present invention eliminates the black-crush phenomenon which occurs in an image when strong light enters the device and improves image quality, it is useful as an image sensor in various imaging devices, such as consumer video cameras, digital still camera, and so on.

What is claimed is:
1. A solid-state imaging device that outputs a luminance signal in accordance with an amount of light entering said device, said device comprising:
   an imaging unit in which plural pixel circuits are arranged one- or two-dimensionally, each pixel circuit including a photoelectric converter, and each pixel circuit outputting a reset voltage and a read voltage, the reset voltage being a voltage generated when said photoelectric converter is reset, and the read voltage being a voltage generated through photoelectric conversion performed by said photoelectric converter;
   a first signal output line that is connected to a number of said plural pixel circuits and that carries the reset voltage and read voltage output from said number of said plural pixel circuits;
   a signal output circuit connected to said first signal output line and which outputs, from a second signal output line, a luminance signal in accordance with an amount of light received by said photoelectric converter, based on the reset voltage and read voltage output to said first signal output line; and
   a high-intensity judgment circuit, connected to said first signal output line via a first capacitor that captures an AC component of a voltage signal in said first output line, said high-intensity judgment circuit that judges whether or not light entering said photoelectric converter is of high intensity based on said AC component of said voltage signal in said first signal output line, and, upon judging that entering light is of high intensity, outputs a luminance signal indicating high intensity to said second signal output line.

2. The solid-state imaging device according to claim 1, wherein said high-intensity judgment circuit judges whether or not the entering light is of high intensity during a period in which said photoelectric converter is reset or immediately after said photoelectric converter has been reset.

3. The solid-state imaging device according to claim 1, wherein said high-intensity judgment circuit is connected to said first capacitor, and includes a first switch transistor which closes or opens a connection between said first signal output line and said high-intensity judgment circuit via said first capacitor.

4. The solid-state imaging device according to claim 3, wherein said first switch transistor cuts the connection so as not to transfer fluctuation in a voltage signal in said first signal output line and in a voltage signal in an input stage of said high-intensity judgment circuit.

5. The solid-state imaging device according to claim 1, wherein said high-intensity judgment circuit judges whether or not a difference between the reset voltage and the read voltage output to said first signal output line is within a predetermined range, and judges that the entering light is of high intensity when the difference is judged not to be within the predetermined range.

6. The solid-state imaging device according to claim 5, wherein the predetermined range is a range that includes a voltage signal output to said high-intensity judgment circuit when light of a maximum intensity enters said plural pixel circuits, and is a range smaller than the dynamic range of the voltage signal output from said plural pixel circuits to said high-intensity judgment circuit.

7. The solid-state imaging device according to claim 1, wherein said high-intensity judgment circuit includes:
   a judgment output circuit that outputs, to said second signal output line, a voltage of having a same polarity as, and being greater than or equal to a saturation of the luminance signal output from said signal output circuit to said second signal output line, when the entering light is judged to be of high intensity.

8. The solid-state imaging device according to claim 1, wherein said high-intensity judgment circuit judges whether or not the entering light is of high intensity during an interval from when said photoelectric converter outputs the reset voltage to said first signal output line to when said photoelectric converter outputs the read voltage to said first signal output line, or an interval from when said photoelectric converter outputs the read voltage to when said photoelectric converter outputs the reset voltage in a next imaging period, and outputs the luminance signal indicating that the entering light is of high intensity.

9. A camera, comprising
   the solid-state imaging device according to claim 1.

10. The solid-state imaging device according to claim 1, wherein said high-intensity judgment circuit includes:
   said first capacitor connected to said first signal output line; and
   a judgment amplifier connected to said first signal output line via said first capacitor, and
   wherein said judgment amplifier judges whether or not the light entering said photoelectric converter is of high intensity based on the AC component of the voltage signal in said first signal output line.

11. The solid-state imaging device according to claim 10, wherein said high-intensity judgment circuit further includes a reset transistor that resets said judgment amplifier.

12. The solid-state imaging device according to claim 11, wherein
a reset pulse is input into said reset transistor, and
an input of said judgment amplifier and an output of said reset transistor are connected to each other.

13. The solid-state imaging device according to claim 12, wherein
said high-intensity judgment circuit further includes an adding circuit that adds the AC component of the voltage signal in said first signal output line and a judgment reference voltage, and
said judgment amplifier judges whether or not the light entering said photoelectric converter is of high intensity based on the voltage signal after the addition performed by said adding circuit.

14. The solid-state imaging device according to claim 13, wherein said judgment amplifier judges whether or not the light entering said photoelectric converter is of high intensity by comparing a voltage of the voltage signal after the addition is performed by said adding circuit with a predetermined threshold voltage.

15. The solid-state imaging device according to claim 10, wherein said judgment amplifier judges whether or not the light entering said photoelectric converter is of high intensity based on the AC component of the voltage signal in said first signal output line and a judgment reference voltage.

16. The solid-state imaging device according to claim 10, wherein one end of said first capacitor is connected to said first signal output line, and an other end of said first capacitor is connected to said judgment amplifier.

17. A solid-state imaging device which outputs a luminance signal in accordance with an amount of light entering said device, said device comprising:
an imaging unit in which plural pixel circuits are arranged one- or two-dimensionally, each pixel circuit including a photoelectric converter, and each pixel circuit outputting a reset voltage and a read voltage, the reset voltage being a voltage generated when said photoelectric converter is reset, and the read voltage being a voltage generated through photoelectric conversion performed by said photoelectric converter;
a first signal output line which is connected to a number of said plural pixel circuits and which carries the reset voltage and read voltage output from said number of said plural pixel circuits;
a signal output circuit connected to said first signal output line and which outputs, from a second signal output line, a luminance signal in accordance with an amount of light received by said photoelectric converter, based on the reset voltage and read voltage output to said first signal output line; and
a high-intensity judgment circuit connected to said first signal output line via a first capacitor, which judges whether or not light entering said photoelectric converter is of high intensity based on a voltage signal in said first signal output line, and, upon judging that entering light is of high intensity, outputs a luminance signal indicating high intensity to said second signal output line,
wherein said high-intensity judgment circuit includes:
a judgment input line, that is a signal line connected to said first capacitor;
a second capacitor, one end of which is connected to said judgment input line; and
a bias voltage adding circuit connected to an other end of said second capacitor and that adds a constant voltage to said judgment input line via said second capacitor, and
said high-intensity judgment circuit judges whether or not the entering light is of high intensity by comparing a voltage at said judgment input line with a constant threshold value after the constant voltage has been added.

18. A solid-state imaging device that outputs a luminance signal in accordance with an amount of light entering said device, said device comprising:
an imaging unit in which plural pixel circuits are arranged one- or two-dimensionally, each pixel circuit including a photoelectric converter, and each pixel circuit outputting a reset voltage and a read voltage, the reset voltage being a voltage generated when said photoelectric converter is reset, and the read voltage being a voltage generated through photoelectric conversion performed by said photoelectric converter;
a first signal output line that is connected to a number of said plural pixel circuits and that carries the reset voltage and read voltage output from said number of said pixel circuits;
a signal output circuit connected to said first signal output line and that outputs, from a second signal output line, a luminance signal in accordance with an amount of light received by said photoelectric converter, based on the reset voltage and read voltage output to said first signal output line; and
a high-intensity judgment circuit connected to said first signal output line via a first capacitor, that judges whether or not light entering said photoelectric converter is of high intensity based on a voltage signal in said first signal output line, and, upon judging that entering light is of high intensity, outputs a luminance signal indicating high intensity to said second signal output line,
wherein said high-intensity judgment circuit includes:
a judgment input line, that is a signal line connected to one end of said first capacitor;
a second capacitor, one end of which is connected to an other end of said first capacitor; and
a bias voltage adding circuit connected to an other end of said second capacitor and that adds a constant voltage to said judgment input line via said second capacitor, and
said high-intensity judgment circuit judges whether or not the entering light is of high intensity by comparing a voltage in said judgment input line with a constant threshold value after the constant voltage has been added.

19. A solid-state imaging device that outputs a luminance signal in accordance with an amount of light entering said device, said device comprising:
an imaging unit in which plural pixel circuits are arranged one- or two-dimensionally, each pixel circuit including a photoelectric converter, and each pixel circuit outputting a reset voltage and a read voltage, the reset voltage being a voltage generated when said photoelectric converter is reset, and the read voltage being a voltage generated through photoelectric conversion performed by said photoelectric converter;
a first signal output line that is connected to a number of said plural pixel circuits and that carries the reset voltage and read voltage output from said number of said plural pixel circuits;
a signal output circuit connected to said first signal output line and that outputs, from a second signal output line, a luminance signal in accordance with an amount of light received by said photoelectric converter, based on the reset voltage and read voltage output to said first signal output line; and a high-intensity judgment circuit connected to said first signal output line via a first capacitor, that judges whether or not light entering said photoelectric converter is of high intensity based on a voltage signal in said first signal output line, and, upon judging that entering light is of high intensity, outputs a luminance signal indicating high intensity to said second signal output line, wherein said high-intensity judgment circuit includes:

a judgment input line, that is connected to said first capacitor; and a judgment amplification circuit that judges whether or not the entering light is of high intensity based on a voltage signal at said judgment input line, that amplifies the voltage signal at said judgment input line, and that outputs the signal obtained through the amplification as a signal indicating a result of the judgment.

20. A driving method for a solid-state imaging device, including an imaging unit, a signal output circuit, and a high-intensity judgment circuit, that outputs a luminance signal in accordance with an amount of received light, the method comprising:

capturing, by a first capacitor, an AC component of a voltage signal in a first output line connected to the high-intensity judgment circuit;

judging whether or not light entering a photoelectric converter is of high intensity based on said AC component of said voltage signal in said first output signal line from a pixel circuit that includes the photoelectric converter; and outputting, to a second signal output line that outputs the luminance signal in accordance with an amount of received light by the photoelectric converter, the luminance signal indicating that the entering light is of high intensity, when the entering light is judged to be of high intensity.

21. The driving method according to claim 20, wherein in the judging, resetting of the photoelectric converter for the judging is performed in advance at a timing later than resetting for photoelectric conversion.

\* \* \* \* \*